US010638342B2

(12) United States Patent
Eckardt et al.

(10) Patent No.: US 10,638,342 B2
(45) Date of Patent: Apr. 28, 2020

(54) DEVICE AND METHOD FOR DEVICE TO DEVICE COMMUNICATION

(71) Applicant: Intel IP Corporation, Santa Clara, CA (US)

(72) Inventors: Florian Eckardt, Dresden (DE); Zhibin Yu, Unterhaching (DE); Rui Huang, Beijing (CN)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 15/776,800

(22) PCT Filed: Dec. 21, 2015

(86) PCT No.: PCT/CN2015/098095
§ 371 (c)(1),
(2) Date: May 17, 2018

(87) PCT Pub. No.: WO2017/107011
PCT Pub. Date: Jun. 29, 2017

(65) Prior Publication Data
US 2018/0332491 A1 Nov. 15, 2018

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0051* (2013.01); *H04W 28/0215* (2013.01);
(Continued)

(58) Field of Classification Search
CPC . H04W 24/08; H04W 28/0215; H04W 76/14; H04W 56/0025; H04W 84/18; H04L 5/0051
See application file for complete search history.

(56) References Cited

U.S. PATENT DOCUMENTS 10,389,502 B2 * 8/2019 Baghel ............. H04W 72/0406
2012/0182857 A1 7/2012 Bertrand et al.
(Continued)

FOREIGN PATENT DOCUMENTS

CN 104365035 A 2/2015
CN 104798328 A 7/2015
(Continued)

OTHER PUBLICATIONS

3GPP TS 36.211, "3rd Generation Partnership Project; Technical Specification Group Radio Access Network; Evolved Universal Terrestrial Radio Access (E-UTRA); Physical channels and modulation (Release 12)", Sep. 2015, pp. 129-131, V12.7.0.
(Continued)

*Primary Examiner* — Min Jung

(57) ABSTRACT

A communication device and method to detect a sidelink identification from a second device for device to device, or sidelink, communication by performing a series of correlations using the demodulation reference signal and a set of demodulation reference templates stored in the memory component of the communication device. The communication device is further configured to reduce the computational complexity of the correlation procedure in the sidelink identification detection process by reducing the number of templates that need to be correlated with the demodulation reference signal and by reducing the number of complex-value multiplications of the correlation process.

22 Claims, 10 Drawing Sheets

(51) Int. Cl.
  *H04W 56/00*   (2009.01)
  *H04W 76/14*   (2018.01)
  *H04W 28/02*   (2009.01)
  *H04W 84/18*   (2009.01)

(52) U.S. Cl.
  CPC ....... *H04W 56/0025* (2013.01); *H04W 76/14* (2018.02); *H04W 84/18* (2013.01)

(56) References Cited

U.S. PATENT DOCUMENTS

| | | | |
|---|---|---|---|
| 2015/0245193 | A1 | 8/2015 | Xiong et al. |
| 2017/0181011 | A1* | 6/2017 | Yu ....................... H04L 27/2601 |
| 2018/0279242 | A1* | 9/2018 | Kwak ................... H04L 5/0048 |
| 2019/0045469 | A1* | 2/2019 | Zhang .................. H04W 76/14 |
| 2019/0053204 | A1* | 2/2019 | Lien ..................... H04L 1/0023 |
| 2019/0239203 | A1* | 8/2019 | Chae ................... H04B 17/327 |

FOREIGN PATENT DOCUMENTS

| | | |
|---|---|---|
| WO | 2013165834 A1 | 11/2013 |
| WO | 2014040069 A2 | 3/2014 |

OTHER PUBLICATIONS

International Search Report based on application No. PCT/CN2015/098095 (12 pages) dated Dec. 21, 2015 (Reference Purpose Only).
Schlienz J. et al., "Device to Device Communication in LTE Whitepaper", Sep. 29, 2015.

\* cited by examiner

US 10,638,342 B2

DEVICE AND METHOD FOR DEVICE TO DEVICE COMMUNICATION

CROSS-REFERENCE TO RELATED APPLICATIONS

This application is a national stage entry according to 35 U.S.C. § 371 of PCT Application No. PCT/CN2015/098095 filed on Dec. 21, 2015, which is incorporated herein by reference in its entirety.

TECHNICAL FIELD

Various aspects of this disclosure relate generally to a method and a communication device for sidelink identification detection for device to device communication.

BACKGROUND

The Third Generation Partnership project (3GPP) Release 12 introduced Long-term evolution (LTE) device to device (D2D) communication, also known as LTE sidelink or sidelink. D2D communication is a technology in which two communication devices, or user equipments (UEs), can communicate with each other with or without the support of a network. It is a Proximity Service (ProSe) which enables LTE-based devices to communicate directly with one another when the devices are in close proximity.

A pre-step for D2D communication is for a UE to discover another UE which transmits the appropriate D2D signals, a step known as synchronization. This procedure is similar to the LTE downlink cell search procedure. In synchronization, the timing information is first detected from the Primary Sidelink Synchronization Signals (PSSS). Then, the Secondary Synchronization Signal (SSSS) is used in order to obtain the physical-sidelink synchronization identity ($N_{ID}^{SL}$). Once the $N_{ID}^{SL}$ has been detected by the receiving UE, the receiving UE can use the $N_{ID}^{SL}$ to decode the demodulation reference signal (DMRS) and apply the sidelink reference signal received power (S-RSRP) measurement in order to report the strength of the detected sidelink.

In order to detect the $N_{ID}^{SL}$, the receiving UE correlates the received SSSS sequences with all possible local templates stored on the UE and chooses the $N_{ID}^{SL}$ in accordance with the template which provides the best correlation, i.e. the highest correlation peak. However, since SSSS sequences are Pseudorandom Noise (PN) sequences, the SSSS based $N_{ID}^{SL}$ detection method may fail in low signal interference noise ratio conditions because the correlation peak of the true $N_{ID}^{SL}$ can be shadowed by interferences and noises. Therefore, there remains a need for a more reliable $N_{ID}^{SL}$ detection method.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the disclosure are described with reference to the following drawings, in which.

DESCRIPTION

Figure 1:
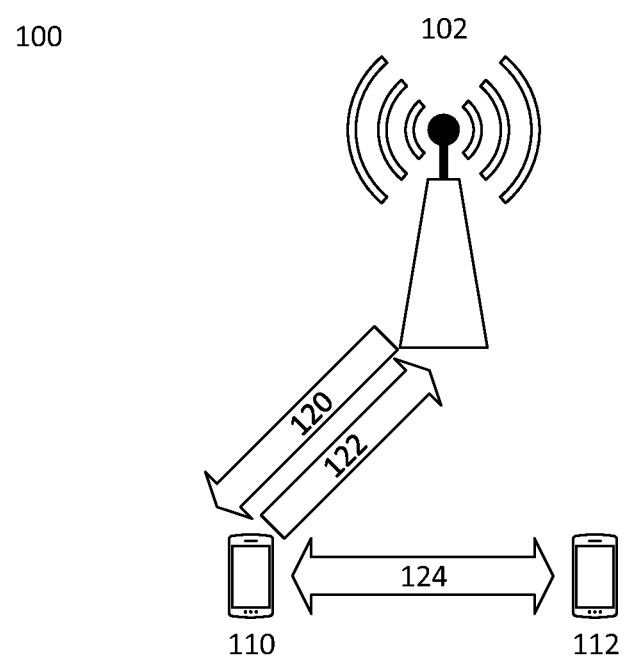
FIG. 1 shows an exemplary illustration of device to device (D2D) communication.

The following details description refers to the accompanying drawings that show, by way of illustration, specific details and aspects of the disclosure may be practiced.

An overview of the technology is provided below, and then specific aspects of the disclosure are discussed in further detail later. This initial overview is not intended to limit the scope of the claimed subject matter or to identify key features of the technology.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[objects] group", "[objects] set", "[objects] collection", "[objects] series", "[objects] sequence", "[objects] grouping", "[objects] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is appreciated that the ensuing description may detail exemplary scenarios involving mobile terminal operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component)

FIG. 1 shows a mobile communication network 100 capable of supporting device to device (D2D) communication. The network may include at least one base station, such as an eNB, 102, and two UEs, 110 and 112. It is appreciated that network 100 is exemplary in nature and may thus be simplified for purposes of this explanation.

Base station 102 may be associated with a Radio Access Network (RAN) of mobile communication network 100, for example, an LTE network. Base station 102 may therefore act as an interface between the RAN of the LTE network and an underlying core network of mobile communication network 100 and may allow proximate mobile terminals, or UEs, such as 110 and 112, to exchange data with the core network of mobile communication network 100 and any further networks connected thereto.

The standard LTE downlink and uplink between a UE and the base station are demonstrated by 120 and 122, respectively. The D2D communication, or sidelink, is demonstrated by 124.

LTE downlink 120 is the signal from the base station to the UE. LTE downlink uses Orthogonal Frequency Division Multiple Access (OFDMA) scheme, which is a multiple access version of Orthogonal Frequency Division Multiplexing (OFDM). OFDM is a frequency-division multiplexing which splits the carrier frequency bandwidth into many small subcarriers and then modulates each individual subcarrier using a digital modulation format. This allows encoding of digital data on multiple carrier frequencies.

OFDMA provides for high data rate through the radio channel as well as other advantages, for example, efficient implementation using Fast Fourier Transforms (FFT) and robustness against inter-symbol interference. However, it also has a high Peak-to-Average Power Ratio (PAPR). While in the downlink this may not be much of a concern since the base station may be well equipped to handle the power consumption and heat dissipation issues, this presents a problem if used in the LTE uplink.

LTE uplink 122 is the signal from the UE to the base station and uses Single Carrier Frequency Division Multiple Access (SC-FDMA) scheme. SC-FDMA has a lower PAPR than OFDM. As a result, SC-FDMA reduces battery power consumption and design complexity compared to OFDM. SC-FDMA also differs from OFDM in that data may be spread across multiple subcarriers, whereas in OFDM, each subcarrier (or frequency component) carries unique information.

In current standards supporting D2D communication, a portion of the available bandwidth spectrum is dedicated for the support of D2D communication, i.e. sidelink 124. The direct interface between two devices supporting D2D communication re-uses the existing frequency allocation. To minimize the power consumption and hardware impact on the UE, transmission of sidelink 124 occurs in the uplink band 122. So, the sidelink 124 also makes use of SC-FDMA.

Figure 2:
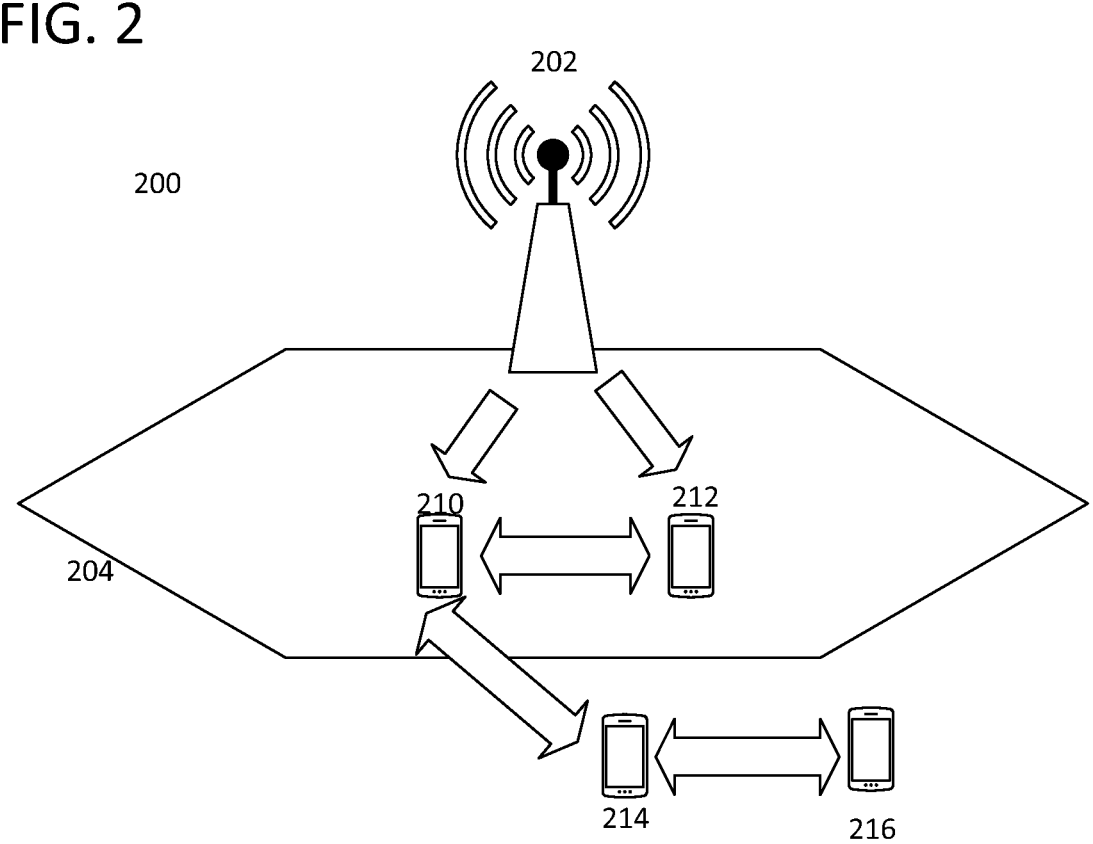
FIG. 2 shows an exemplary illustration of D2D communication in relation to a network which supports D2D communication.

FIG. 2 shows examples of several sidelink scenarios. It is appreciated that 200 is exemplary in nature and may thus be simplified for purposes of this explanation.

In a first scenario in FIG. 2, both UE 210 and 212 are within network coverage 204 of eNB 202. In this scenario, the network controls the resources used for the sidelink communication and directly provides the sidelink synchronization signals to UEs 210 and 212. It may assign specific resources to a transmitting UE (either 210 or 212 in this case) or may assign a pool of resources from which the transmitting UE may select from. In this manner, cellular interference with other devices may be avoided and the sidelink communication may be optimized.

In a second scenario in FIG. 2, UE 210 is in coverage of the network 204 and UE 214 is out of coverage of the network 204. In this scenario, the out of coverage UE 214 uses preconfigured values stored on its device and the in coverage UE 210 gets its resources from the eNB 202. The synchronization signals from the out of coverage UE 214 will indicate that it is out of network coverage, while synchronization signals from the in coverage UE 210 indicate that it is in network coverage.

In a third scenario in FIG. 2, both UE 214 and UE 216 are out of coverage of the network. In this case, the eNB 202 cannot provide any control to the UEs. Both UEs 214 and 216 must use preconfigured resources located on their respective device in order to synchronize with each other. Both UEs 214 and 216 will transmit synchronization signals which indicate that each are out of network coverage 204. It is important to note that being out of coverage for sidelink does not mean that there is no coverage at all, but rather, it means that there is no coverage on the frequency range used for the sidelink communication. It is entirely possible either or both of UEs 214 and 216 may be in coverage on a different cellular carrier.

Figure 3:
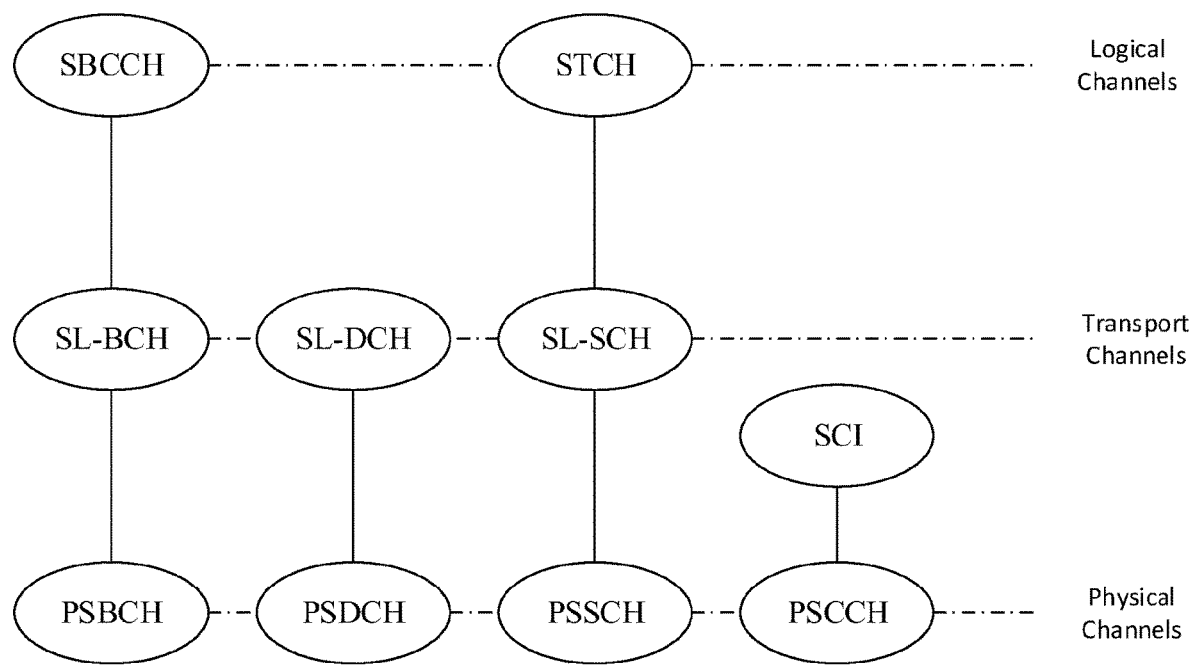
FIG. 3 shows the channel mapping for the logical, transport, and physical channels in D2D communications.

FIG. 3 shows the channel mapping for the physical, transport, and logical channels of sidelink communication.

The physical channels for sidelink communication are the Physical Sidelink Broadcast Channel (PSBCH), the Physical Sidelink Discovery Channel (PSDCH), the Physical Sidelink Shared Channel (PSSCH), and the Physical Sidelink Control Channel (PSCCH).

The PSBCH carries the system and synchronization related information transmitted from the transmitting UE. The PSBCH is the channel responsible for the discovery phase of D2D communications. The PSDCH carries the Proximity Service (ProSe) discovery message from the UE. The PSCCH carries the Sidelink Control Information (SCI) block which is responsible for carrying the control information for a UE for ProSe direct communication. The PSSCH carries data for D2D communication.

The transport channels are the Sidelink Broadcast Channel (SL-BCH), Sidelink Discovery Channel (SL-DCH), and the Sidelink Shared Channel (SL-SCH). The SL-BCH is mapped onto the PSBCH, the SL-DCH is mapped onto the PSDCH and the SL-SCH is mapped onto the PSSCH. The SL-BCH is a predefined transport format, as is the SL-DCH, which provides a pre-defined format for broadcast information. The SL-SCH provides support for the broadcast transmission.

The logical channels are the Sidelink Broadcast Control Channel (SBCCH) and the Sidelink Traffic Channel (STCH). The SBCCH is mapped onto the SL-BCH and the STCH is mapped onto the SL-SCH. The STCH is a point to multipoint channel for transfer of user information from one UE to other UEs. This channel may only be used by ProSe capable UEs.

Figure 4:
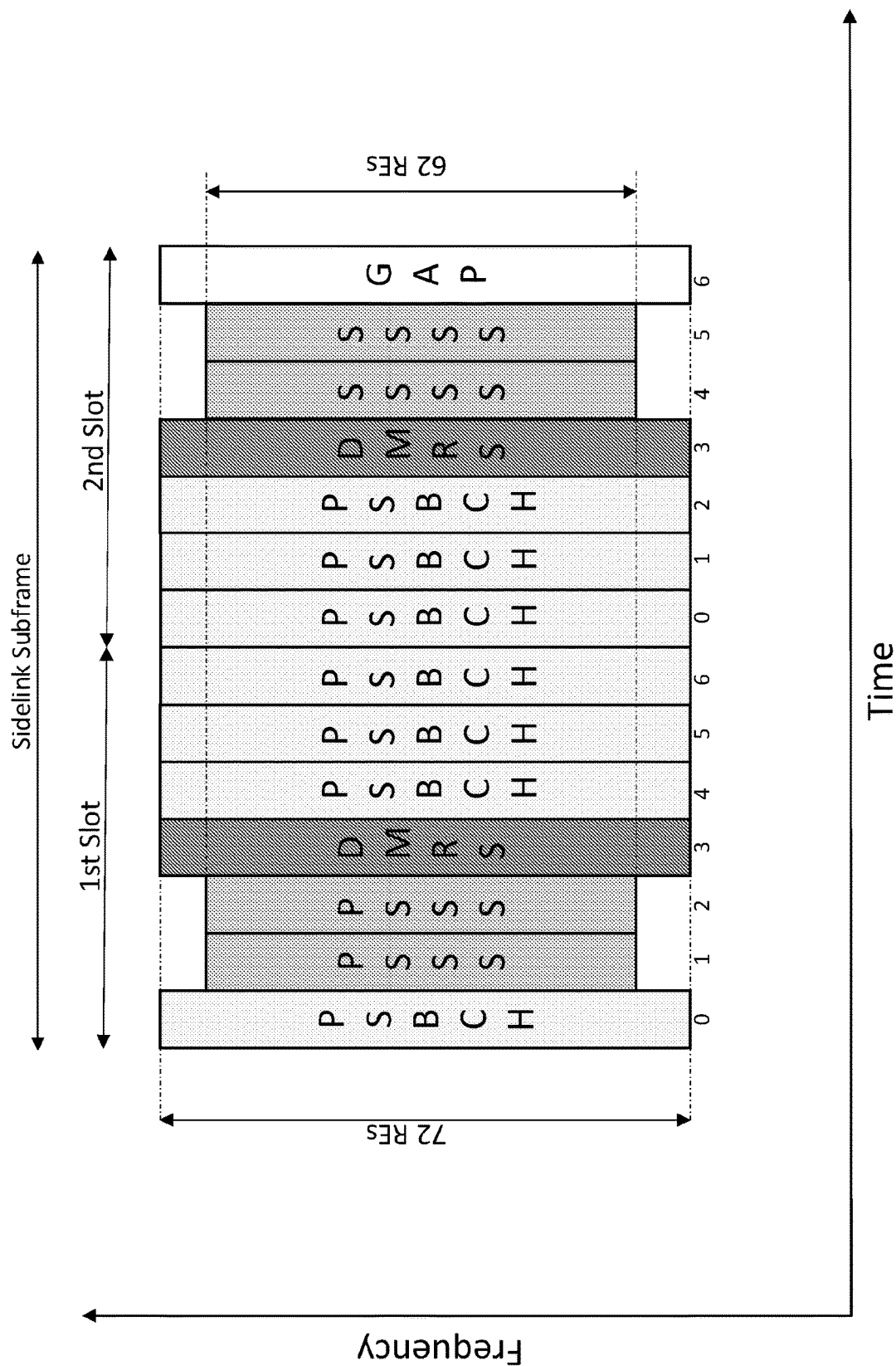
FIG. 4 shows an exemplary frame structure of a synchronization subframe in D2D communication.

FIG. 4 shows an exemplary structure of a synchronization subframe in sidelink communication.

The length of the sidelink subframe is 1 millisecond (ms) on the time axis, with each of the 1st and 2nd slots being 0.5 ms in duration and consisting of 7 symbols (each with numbers 0 through 6). The PSBCH and the demodulation reference signal (DMRS) span 72 resource elements (REs), or subcarriers, of the frequency axis, while the Primary Sidelink Synchronization Signals (PSSS) and the Secondary Sidelink Synchronization Signal (SSSS) each span 62 REs. The PSBCH occupies symbols 0 and 4-6 of the 1st slot and symbols 0-2 of the 2nd slot. The PSSS occupies symbols 1-2 of the 1st slot while the DMRS occupies symbol 3 of the 1st slot and 2nd slot. The SSSS occupies symbols 4-5 of the 2nd slot, while the sixth symbol of the 2nd slot is reserved as a gap slot.

The current synchronization scheme is a SSSS based physical-sidelink synchronization identity ($N_{ID}^{SL}$) detection method. After receiving the PSBCH, which carries the system and synchronization information from the transmitting UE, the receiving UE detects the timing synchronization using Primary Sidelink Synchronization Signals (PSSS) and then uses the timing information from the PSSS to detect the Secondary Synchronization Signal (SSSS). The receiving UE uses the SSSS to obtain the physical-sidelink synchronization identity ($N_{ID}^{SL}$). Once the $N_{ID}^{SL}$ is obtained, the receiving UE can use the $N_{ID}^{SL}$ to decode the demodulation reference signal (DMRS) and apply the sidelink reference signal received power (S-RSRP) measurement in order to report the strength of the detected sidelink.

In order to detect the $N_{ID}^{SL}$, the UE correlates the received SSSS sequences with all possible local templates stored on its device and makes the synchronization decision based on the template with the best correlation peak.

Since SSSS sequences are Pseudorandom Noise (PN) sequences, the auto-correlation peak is less sharp than those of sequences generated by Zadoff-Chu (ZC) sequences. As a result, in low signal interference noise ratio conditions, the SSSS based $N_{ID}^{SL}$ detection method are prone to failure because the correlation peak of a true ID could be shadowed by interferences and noises.

In an aspect of this disclosure, the $N_{ID}^{SL}$ detection method uses the DMRS signal instead. Because DMRS signals are generated by Zadoff-Chu sequences, the DMRS detection method shows better sensitivity compared to the SSSS detection method.

In the sidelink synchronization scheme, the DMRS is uniquely defined by the $N_{ID}^{SL}$. Therefore, it is possible to determine the $N_{ID}^{SL}$ according to the highest correlation peak of the DMRS signal with a local DMRS template stored on a UE.

Figure 5:
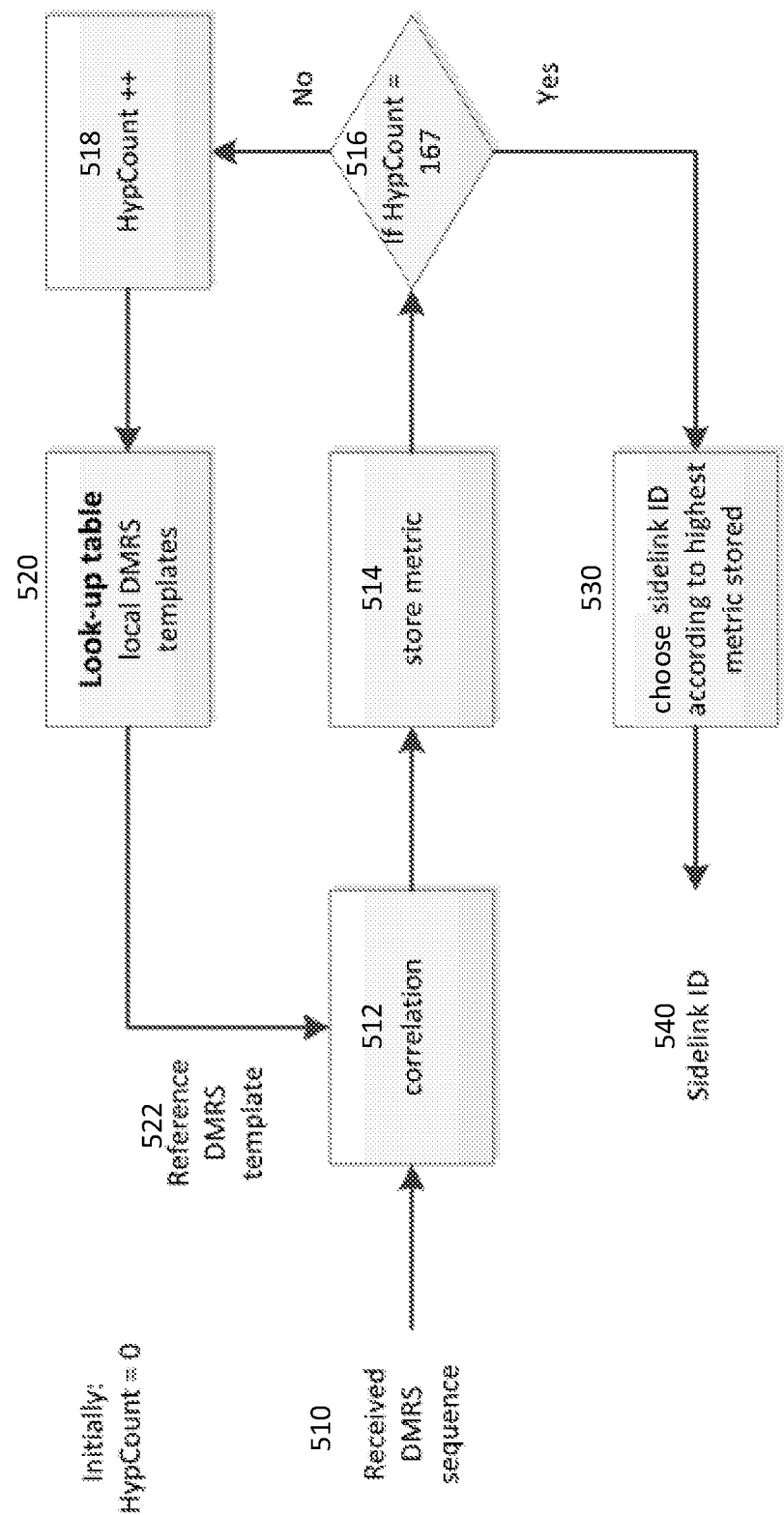
FIG. 5 shows a block diagram in an aspect of the disclosure in which the DMRS is used in order to determine the sidelink ID.

FIG. 5 shows a high-level flowchart 500 depicting a DMRS based sidelink ($N_{ID}^{SL}$) detection method in an aspect of this disclosure.

Not pictured in this flowchart is that the PSSS signal has already been received by the receiving communication device, i.e. UE. After detecting the PSSS, the UE will know the timing boundary of the SSSS and the DMRS, which provides information whether the sidelink ID is between 0-167 or 168-335. This is critical because instead of having to correlate 336 DMRS templates (covering all the possible DMRS sequences) with the DMRS, the UE will only have to correlate 168. It is also important to note that after the DMRS is received, the HypCount starts at zero, i.e. initially, the process commences with the first DMRS template.

In 510, the receiving UE receives the DMRS signal (i.e. the DMRS sequence) from the transmitting UE. After receiving the DMRS, the receiving UE performs a correlation 512. The DMRS is correlated with a DMRS template 522, which may be stored in a look-up table on the device (e.g. in a memory component of the UE, on a subscriber identity module (SIM) chip, etc.). In the case where the HypCount=0, correlation 512 is the first correlation between the DMRS and a DMRS template.

Correlation 512 involves calculating a metric for the DMRS signal and the particular DMRS template being correlated, e.g. if HypCount=0, with the first local DMRS template. Once the correlation between the DMRS and the DMRS template is performed, a metric measuring the correlation peak between the DMRS and the respective template is stored 514.

In 516, the UE determines whether there are any more reference templates with which the DMRS signal must be correlated. Since the PSSS has provided the timing information of the DMRS, the receiving UE only has to correlate the DMRS with the 168 templates. While the UE only has to use the 168 templates in the correlation process, it is important to note that the UE has all 336 DMRS reference templates stored on its device.

If the HypCount does not equal 167, there are more correlations to perform (note: the first correlation occurs at HypCount=0, so if Hypcount=167, then this means that there have been a total of 168 correlations performed) and the HypCount is increased by one count (e.g., from 0 to 1) 518. Then, the next DMRS template is looked up on the table (or list, etc.) that contains all of the DMRS templates in 520. This new template is used to perform another correlation in 512 and the metric for the correlation peak for this DMRS template is stored 514. This process is repeated until the Hypcount reaches 167. Once the HypCount reaches 167, the DMRS signal has been correlated with all possible DMRS templates, and the UE can choose the sidelink ID 530 associated with the DMRS template with the highest metric calculated and stored. The final step is to use the selected sidelink ID 540 in order to synchronize with the transmitting UE.

The core of this aspect of the disclosure is the correlation block 512. This process is done according to the following equation:

$$M_{Dh} = \sum_{i=0}^{143} D_{rec}^{(i)} * D_h^{(i)*}, h \in \{0, 1, \ldots, 167\} \quad (1)$$

$M_{Dh}$ denotes the metric M based on the DMRS correlation with DMRS template h, i.e. one of the 168 DMRS templates used during the correlation process. $D_{rec}^{(i)}$ denotes bit i of the received DMRS sequence. The DMRS sequence is composed of 144 bits. $D_h^{(i)*}$ denotes bit i of the complex conjugate of the DMRS template h. Since the PSSS has already been received, only 168 possible DMRS signals (and consequently, sidelink IDS, or $N_{ID}^{SL}$) are possible. As a result, there are 168 complex DMRS metrics ($M_{D0}$, $M_{D1}$ ... $M_{D167}$) which are determined and stored, whereas the one with the highest absolute value indicates the correct sidelink ID ($N_{ID}^{SL}$).

Figure 6:
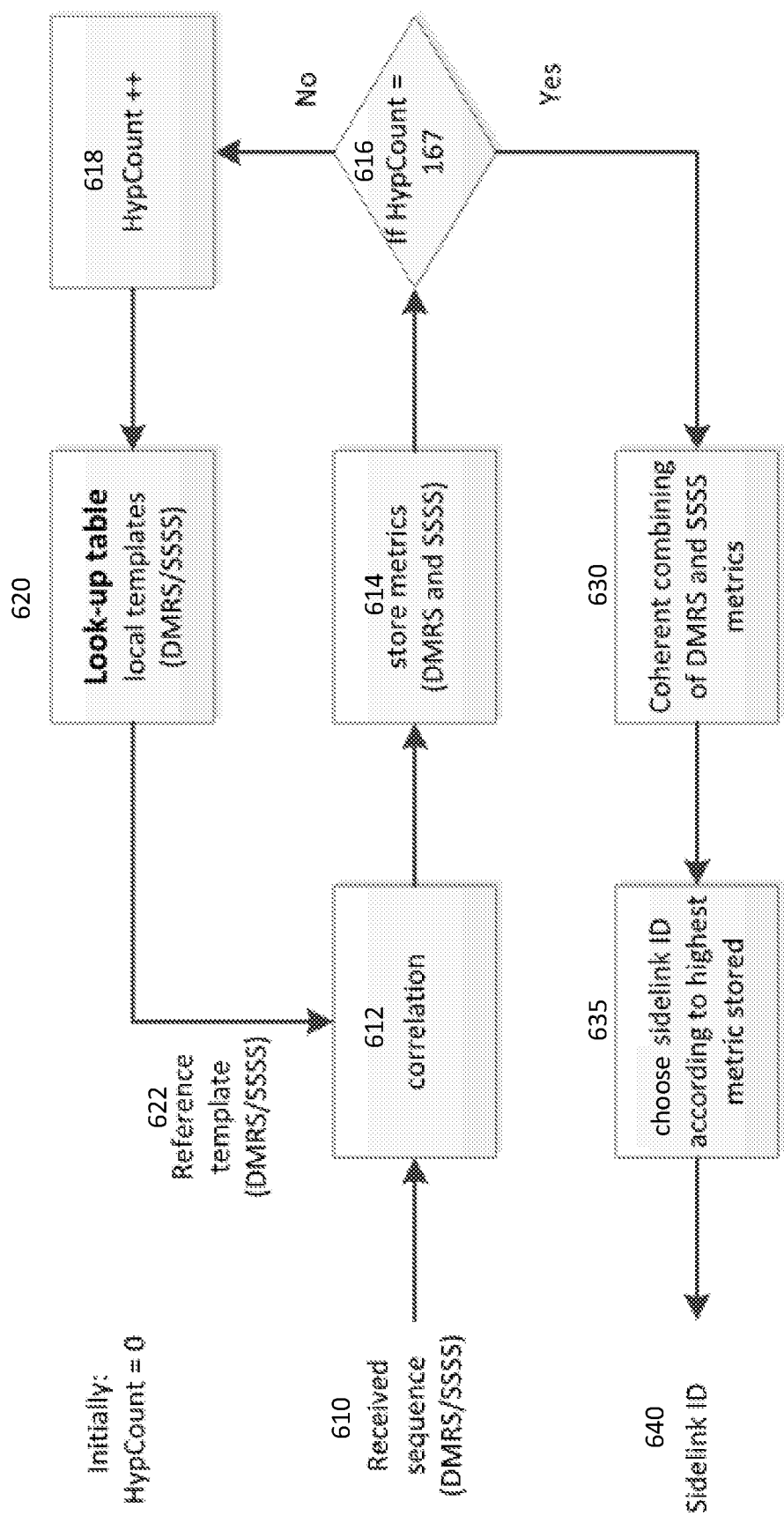
FIG. 6 shows a block diagram in an aspect of the disclosure in which the DMRS and the SSSS are used in order to determine the sidelink ID.

FIG. 6 is a high-level block diagram 600 showing another exemplary aspect of this disclosure in which a combined metric of the DMRS and the SSSS may be used to determine the sidelink ID. For this aspect of the disclosure, a similar procedure as the one shown in FIG. 5 is employed, with the additional aspect that the SSSS also undergoes a correlation with the aforementioned DMRS correlation.

The received DMRS and the SSSS are both subject to a correlation in 612. Each signal, the DMRS and the SSSS, has set of templates with which it is correlated to, i.e. there is a reference template pair (DMRS and SSSS) for each HypCount. For example, at HypCount=0, a reference DMRS template corresponding to HypCount=0 and a SSSS template corresponding to HypCount=0 are correlated with their respective signals. The SSSS signal is correlated in a similar manner as the DMRS signal, shown in the following equation:

$$M_{Sh} = \sum_{i=0}^{123} S_{rec}^{(i)} * S_h^{(i)*}, h \in \{0, 1, \ldots, 167\} \quad (2)$$

$M_{Sh}$ denotes the metric M based on the SSSS of template h. $S_{rec}^{(i)}$ denotes bit i of the received SSSS sequence. The SSSS sequence is composed of 124 bits. $S_h^{(i)*}$ denotes bit i of the complex conjugate of the SSSS template h. As previously indicated, since the PSSS has already been detected, only 168 possible SSSS signals (and consequently, sidelink IDS, or $N_{ID}^{SL}$) are possible, similar to the DMRS. As a result, there are 168 complex SSSS metrics ($M_{S0}$, $M_{S1}$, ..., $M_{S167}$) which are determined and stored along with the 168 complex DMRS metrics ($M_{D0}$, $M_{D1}$, ..., $M_{D167}$).

In 614, the metrics for each DMRS and SSSS correlation are stored, and the process is repeated until all 168 DMRS and SSSS templates have been correlated with their respective signal. Once the correlations for all 168 templates for each DMRS and SSSS have been performed, the DMRS and the SSSS metrics of each pairing (e.g. $M_{S0}$ and $M_{D0}$, $M_{S1}$ and $M_{D1}$, ..., $M_{S167}$ and $M_{D167}$) are combined 630 in order to determine the highest combined metric. This step may involve coherent combination, as shown in 630, or it may involve non-coherent combination (not shown). The combination is done according to the following equation:

$$M_{Ch} = \sum_{h=0}^{167} M_{Dh} + M_{Sh} \quad (3)$$

In Equation (3), $M_{Ch}$ denoted the coherently combined metric M of the DMRS and the SSSS for hypothesis (i.e. template pairing) h. Similar to the procedure as before, the highest absolute value of the combined metric $M_{Ch}$ indicates the correct sidelink ID ($N_{ID}^{SL}$).

As an alternative, non-coherent combination of the DMRS and the SSSS metrics may be used in order to determine the correct sidelink ID ($N_{ID}^{SL}$). The determination between whether coherent or non-coherent combination should be used depends on the assumptions and the steps to be performed since non-coherent combination involves adding the amplitude but not the phase of the signal.

In another embodiment, the DMRS and SSSS metrics may be combined prior to being stored so that the combined metric is stored (not shown). In this manner, 630 would occur prior to or with 614, so that the combined metric for each of the correlations is stored prior to the performance of the next correlation. Then, once all of the correlations have been completed, the combined metric with the highest correlation can be used in order to choose the sidelink ID in 635.

Figure 7:
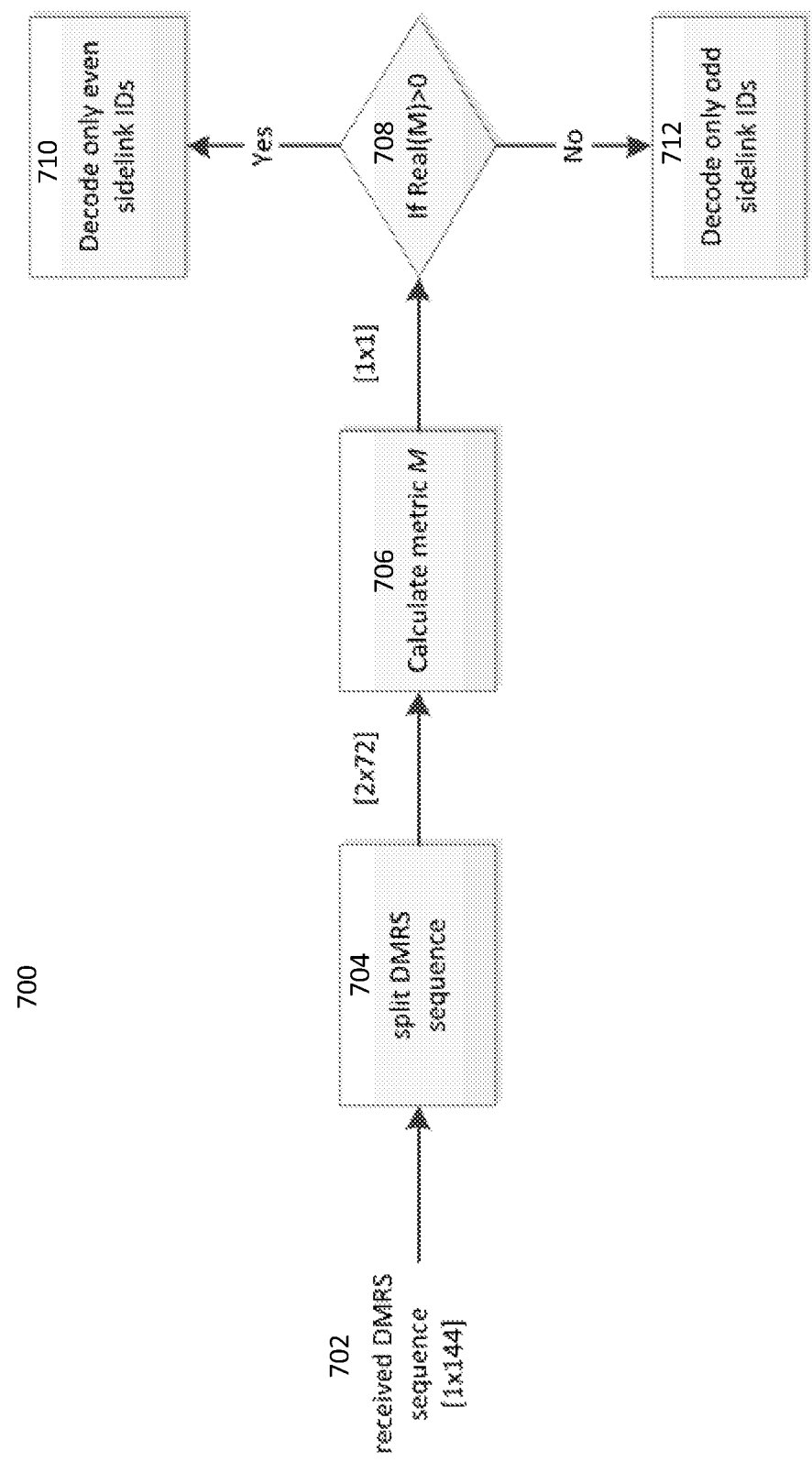
FIG. 7 shows a block diagram in an aspect of the disclosure in which the number of DMRS reference templates correlated with the DMRS may be reduced.

FIG. 7 is a high-level block diagram 700 of another exemplary aspect of this disclosure which shows a way to accelerate the correlation process of the DMRS.

In FIG. 5, a total of 168 reference DMRS templates are correlated with the DMRS in order to determine the sidelink ID. However this correlation process can be reduced by about 50% by splitting the DMRS in half and correlating both halves of the DMRS together in order to determine the parity of the signal (i.e. whether the signal is even or odd).

To understand this idea, it is important to know the structure of the DMRS. The sidelink DMRS is explained in 3GPP TS 36.211 chapter 9.8, which defines the orthogonal sequence of the DMRS associated with the PBSCH as:

$$[w(0) \; w(1)] = \begin{cases} [1 \quad 1] & \text{if } N_{ID}^{SL} \bmod 2 = 0 \\ [1 \; (-1)] & \text{if } N_{ID}^{SL} \bmod 2 = 1 \end{cases} \quad (4)$$

In chapter 5.5.2.1.1, the first equation is:

$$r_{PBSCH}(m*72+n) = w(m)*r_{u,v}^{(\alpha)} m \in \{0,1\}, n \in \{0,1, \ldots, 71\} \quad (5)$$

From FIG. 4, the length of one DMRS symbol is 72 REs (or subcarriers) and $r_{PBSCH}$ is the DMRS sequence associated with the PSBCH. In order to simplify the analysis, $r_{u,v}^{(\alpha)}$ can be denoted as x, where x is a sequence of length 72.

Inserting the orthogonal sequence w in equation (5) gives the following result:

$$r_{PBSCH} = \begin{cases} [x \quad x] & \text{if } N_{ID}^{SL} \bmod 2 = 0 \\ [x \; (-x)] & \text{if } N_{ID}^{SL} \bmod 2 = 1 \end{cases} \quad (6)$$

Equation (6) means that if the sidelink ID is even (i.e. if its parity is even), then the DMRS is of type [x x]. In other words, if the sidelink ID is even, then the first half and the second half of the DMRS signal, i.e. the DMRS of symbol 3 in the 1st slot and the DMRS of symbol 3 in the 2nd slot shown in FIG. 4, are the same. If the sidelink ID is odd (i.e. its parity is odd), then the DMRS is of type [x (-x)]. In other words, the second half of the DMRS signal is the negative of the first half of the DMRS signal.

In order to determine the parity of the sidelink ID, i.e. whether it is even or odd, the first half of the DMRS is auto-correlated with the second half of the DMRS. The first half is multiplied and added with the complex conjugate of the second half of the DMRS sequence. This can be modeled by the following equations:

$$y_i = H_i * x_i + n \quad (7)$$

In this equation, $H_i$ is the channel transfer function, n is Additional White Gaussian Noise (AWGN), and i ranges from 0 to 143. For the auto-correlation approach of this aspect of the disclosure, the metric is computed as the following:

$$M = \sum_{i=0}^{71} y_i * y_{i+72}^* \quad (8)$$

where y* denotes the complex conjugate of y.

As a result, for even type [x x]:

$$M = \sum_{i=0}^{71} |Hx_i|^2 + n \quad (9)$$

And for odd type [x -x]:

$$M = -\sum_{i=0}^{71} |Hx_i|^2 + n \quad (10)$$

To make the classification between the two types (whether the sidelink ID is even or odd), a maximum likelihood (ML) detector is employed. If the real part of the computed metric M is larger than zero, then the sidelink ID is detected as even. Otherwise, the sidelink ID is detected as being odd.

In 702, the DMRS signal is received by the UE. The DMRS signal is 144 bits in total length, so it may be defined in a matrix with dimensions [1×144]. In 704, the DMRS sequence is split into half, which results in a matrix with dimensions [2×72]. Then, in 706, the metric M is calculated as described in equations (7) and (8) above, and defined in a matrix of dimensions [1×1]. In 708, the ML detector is employed to determine whether the real part of the computed metric M is larger than zero. If it is larger than zero 710, then only DMRS templates that correspond to even number sidelink IDs need to be correlated. If it is less than zero 712, then only DMRS templates that correspond to odd number sidelink IDs need to be correlated. In this manner, if this process if performed before the correlation described in 512 of FIG. 5, the number of possible sidelink IDs is reduced from 168 to 84, and therefore reduces the templates that need to be correlated from 168 to 84. This saves computation time and computation power by about 50%.

Figure 8:
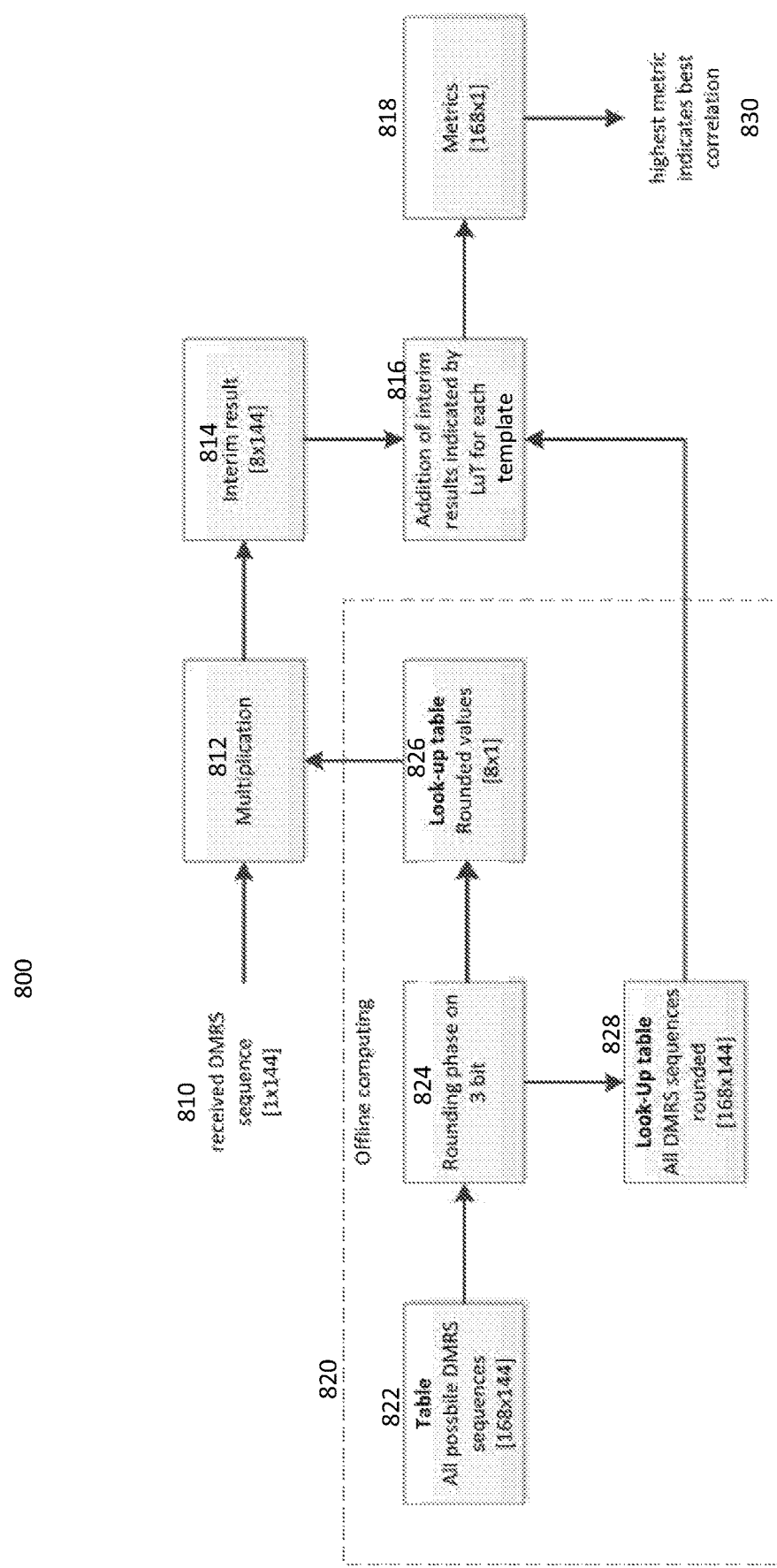
FIG. 8 shows a block diagram in an aspect of the disclosure which reduces the complexity of the DMRS correlation.

FIG. 8 shows an aspect of this disclosure in which the computational complexity of the DMRS based correlation process may be reduced.

The DMRS correlation method has a higher computational complexity than the SSSS method. This is attributed to the fact that the SSSS is a pseudorandom noise (PN) sequence and its blind correlation process can be significantly sped up by Fast Hadamard Transform (FHT). But, since the DMRS is a Zadoff-Chu sequence, FHT cannot be used in order to speed up the correlation process.

Diagram 800 shows an aspect of this disclosure which reduces the computational complexity for the DMRS based correlation process. It shows a process to reduce the number of complex-value multiplications, which are the most hardware/time expensive components of the blind correlation process, while exhibiting minimal loss in performance.

As in the previous figures, the PSSS received by the communication device has already provided the timing information of the DMRS signal. As a result, this limits the number of correlations that need to be performed to 168.

Box 820 (the box indicated by the dashed line) shows an offline computing process. The process in 820 need only be performed one after which the results can be stored in a memory component of the communication device.

In 822, the process in 820 starts with a table containing the 168 possible DMRS sequences after the PSSS reception has provided the timing information of the DMRS. So, 168 DMRS templates each with a length of 144 bits are used, giving a table (or matrix) with dimensions [168×144] for all possible DMRS sequences.

The formula used to calculate the correlation of the received DMRS with the DMRS templates is shown in equation (1), which is reproduced below:

$$M_{Dh} = \sum_{i=0}^{143} D_{rec}^{(i)} * D_h^{(i)*}, h \in \{0, 1, \ldots, 167\} \text{ reproduced} \quad (9)$$

The number of multiplications needed here is 144*168=24,192. This can be demonstrated when looking at the matrices which are multiplied:

$$\begin{bmatrix} a_0^0 & a_0^1 & \ldots & a_0^{142} & a_0^{143} \\ a_1^0 & a_1^1 & \ldots & a_1^{142} & a_1^{143} \\ \vdots & \vdots & \ddots & \vdots & \vdots \\ a_{166}^0 & a_{166}^1 & \ldots & a_{166}^{142} & a_{166}^{143} \\ a_{167}^0 & a_{167}^1 & \ldots & a_{167}^{142} & a_{167}^{143} \end{bmatrix} * \begin{bmatrix} D_{rec}^{(0)} \\ D_{rec}^{(1)} \\ \vdots \\ D_{rec}^{(142)} \\ D_{rec}^{(143)} \end{bmatrix} = \begin{bmatrix} M_{D0} \\ M_{D1} \\ \vdots \\ M_{D166} \\ M_{D167} \end{bmatrix} \quad (11)$$

Where each $a_h^i$ is the complex conjugate of element i of template h (note: $a_h^i$ in equation (11) corresponds to $D_h^{(i)*}$ from equation (1)); $D_{rec}^{(i)}$ is element i of the received DMRS sequence; and $M_{Dh}$ is the cross correlation of the received sequence and reference template h.

In 824, a rounding phase on three bits is implemented in order to reduce the number of complex conjugates to 8. This is achieved by mapping all elements α to 3 bits. Other implementations may be possible, such as four bit rounding. The proper rounding implementation can take a variety of factors into account, such as balancing between the decoding failure rate and the achieved gain of speed.

Since the DMRS is a Zadoff-Chu sequence, all points of all DMRS reference sequences are part of the unit circle. Each point is generated by the simplified formula $e^{j*x}$. Since the absolute value is always 1 (since it must be on the unit circle), each point of the DMRS's phase may be rounded on 3 bit. This results in each sequence being a combination of the points shown in FIG. 9. However, the DMRS sequence is still of length 144.

The rounding procedure of 824 in FIG. 8 can be described in three steps: (1) determining the phase of the complex symbol, (2) map the whole range of 2π of the phase to 3 bit, and (3) converting the rounded phase back to a complex symbol with an absolute value of 1.

Figure 9:
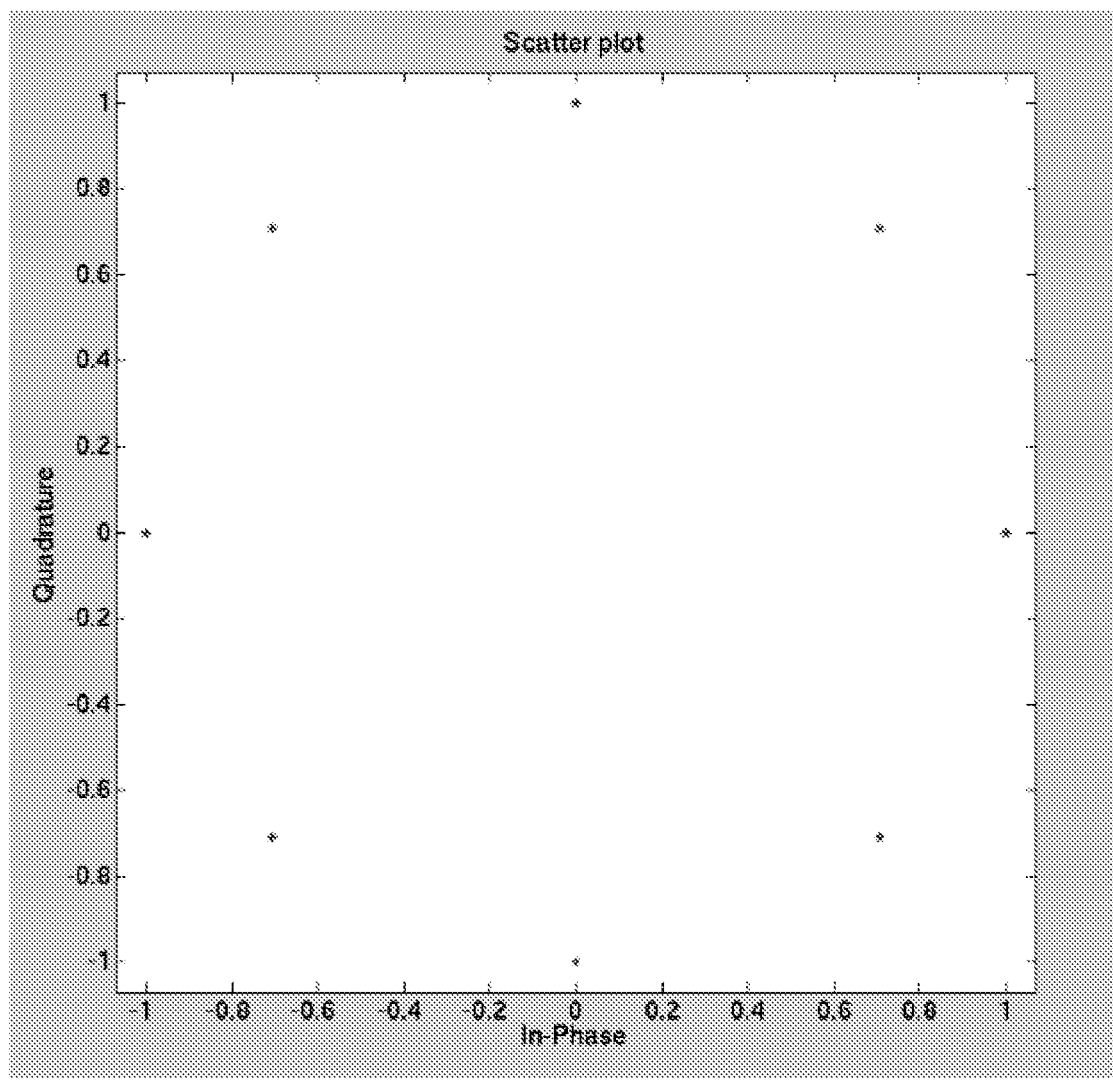
FIG. 9 shows a chart in an aspect of the disclosure which may be used in order to reduce the complexity of the DMRS correlation.

The points shown in FIG. 9 are stored in a look up table, as shown in 826 of FIG. 8. These points are shown as $[r_0, \ldots r_7]$.

As a consequence of the rounding phase, the entire matrix of size [168×144] does not need to be multiplied. Instead, we can multiply by only several points since there are only 8 different elements of a. With $D_{rec}^{(i)}$ consisting of 144 elements, the number of multiplications is 8*144=1,152. The number of complex multiplications is 21 times less (24,192/ 1,152) than the direct matrix multiplication implementation By using the 3 bit rounding in 824, a table of dimensions [8×1] with values $[r_0, \ldots, r_7]$ is generated, and this table is used in the multiplication with the received DMRS signal in 812. This multiplication can be shown by the following equation:

$$p = \begin{bmatrix} r_0 \\ \vdots \\ r_7 \end{bmatrix} * [D_{rec}^{(0)} \ldots D_{rec}^{(143)}] \quad (12)$$

p is the interim result matrix of dimensions [8×144] shown in 814. By using p, which has only 1152 entries, we reduce the number of complex-value conjugates when compared to the direct matrix multiplication implementation using the by [168×144] table by 21 times ((168*144)/ (8*144)=21).

Now, only certain sets of the multiplication of results need to be summed together to get the metrics for all templates in 816, shown by the following equation:

$$M_h = \sum_{j=0,i}^{j=143} p_{i,j} \quad (13)$$

Where i denotes the row of matrix p and j denotes the column. Index i is stored in a look up table for each template and describes the order of elements r occurring in the template. $M_h$ is the metric for each template h, or the possible 168 DMRS reference templates. In 830, the highest value of $M_h$ is used to provide the DMRS template with the highest correlation.

To summarize the aspect of the disclosure shown in FIGS. 8 and 9, the procedure of matrix multiplication is divided into two parts.

The first step is to reduce the number of complex-value multiplications by using a reduced version of the DMRS template matrix generated by the 3 bit rounding process described above. The second step is to sum the set of the multiplication results for one template, and repeat this addition for all possibilities, i.e. the 168 DMRS templates.

Figure 10:
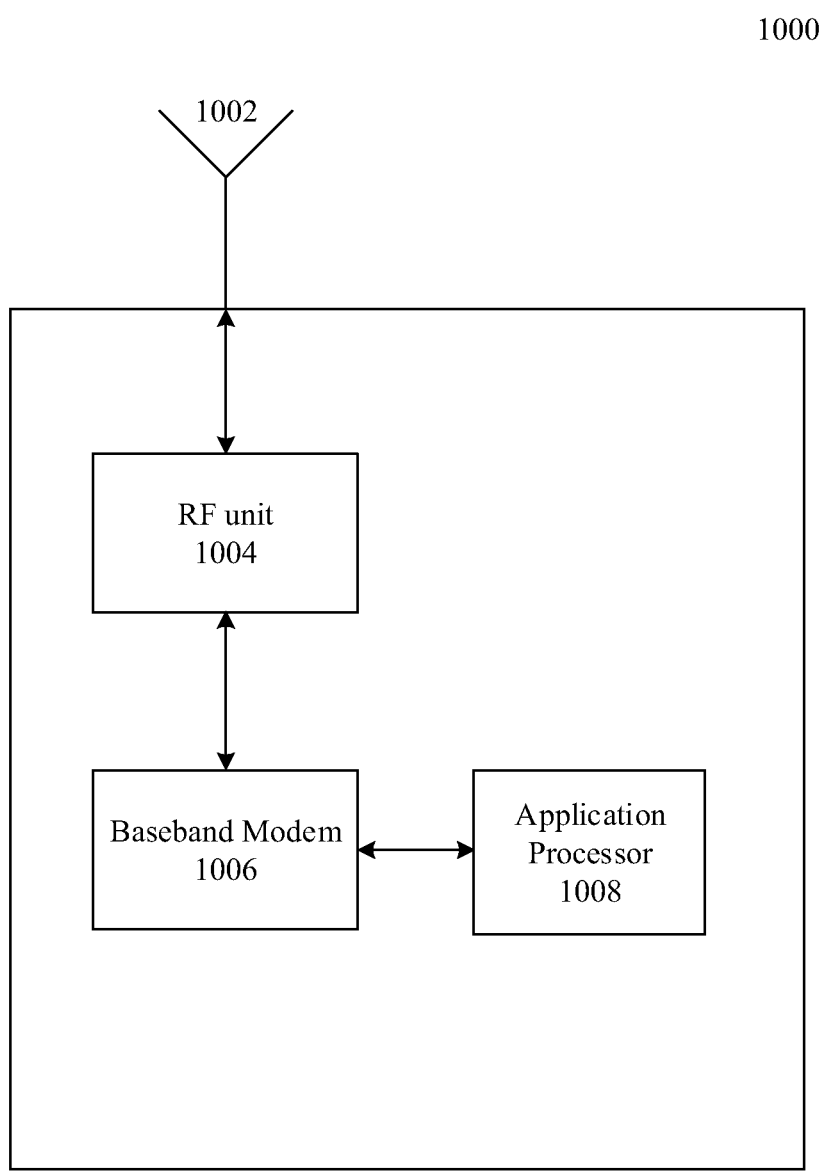
FIG. 10 shows an example of a mobile terminal in an aspect of the disclosure.

FIG. 10 shows a mobile terminal 1000 in an aspect of this disclosure. This mobile terminal may correspond, for example, to mobile terminals 110 and/or 112 of FIG. 1 and/or mobile terminals 210, 212, 214, and/or 216 of FIG. 2.

As shown in FIG. 10, mobile terminal 1000 may include an antenna 1002, radio frequency (RF) unit 1004 (i.e. RF transceiver), baseband modem 1006, and application processor 1008. As shown in FIG. 10, these components may be implemented as separate components. However, as depicted in FIG. 10, it is appreciated that the configuration of mobile terminal 1000 is for purposes of explanation, and accordingly, one or more of the aforementioned components of mobile terminal 1000 may be integrated into a single equivalent component or divided into multiple components with collective equivalence. It is also appreciated that mobile terminal 1000 may have one or more additional components, such as hardware, software, or firmware elements. For example, mobile terminal 1000 may also include various additional components including processors, microprocessors, at least one memory component, subscriber identity module(s) (SIM), at least one power supply, peripheral device(s) and other specialty or generic hardware, processors, or circuits, etc., in order to support a variety of additional operations. For example, mobile terminal 1000 may also include a variety of user input/output devices, such as display(s), keypad(s), touchscreen(s), speaker(s), microphone(s), button(s), camera(s), etc.

In an overview of the operation of mobile terminal 1000, mobile terminal 1000 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, sidelink (D2D) communication, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of mobile terminal 1000 may be shared between different wireless access protocols, such as, for example, by sharing an antenna 1002 between multiple different wireless access protocols or RATs, including D2D communication. In an exemplary aspect of this disclosure, RF unit 1004 and/or baseband modem 1006 may operate according to multiple communication access protocols (i.e. "multi-mode"), and thus may be configured to support one or more of LTE, GSM, and/or UMTS access protocols.

Furthermore, RF unit 1004 may receive frequency wireless signals, such as any signals associated with D2D communication (e.g. PSSS, SSSS, DMRS, etc.) via antenna 1002, which may be implemented as, for example, a single antenna or an antenna array composed of multiple antennas. RF unit 1004 may include various reception circuitry elements, for example, analog circuitry configured to process externally received signals, such as circuitry to convert externally received RF signals to baseband and/or intermediate frequencies. RF unit 1004 may also include amplification circuitry to amplify externally received signals, such power amplifiers and/or Low Noise Amplifies, although it is appreciated that such components may also implemented separately. RF unit 1004 may additionally include various transmission circuit elements configured to transmit signals, such as, for example, baseband and/or intermediate frequency signals provided by the baseband modem 1006, which may include mixing circuitry to module signals onto one or more radio frequency carrier waves and/or amplification circuitry to amplify internal signals before transmission. The RF unit 1004 may provide such signals to antenna 1002 for wireless transmission. Although not explicitly depicted in FIG. 10, RF unit 1004 may be additionally connected to application processor 1008.

Baseband modem 1006 may include digital processing circuit(s) and a baseband memory, and may include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 1006 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 1006 and may also be partially or fully integrated with the digital processing circuitry.

The baseband modem 1006 may be configured to operate one or more protocol stacks, such as a GSM protocol stack, an LTE protocol stack, a UMTS protocol stack, etc. or any combination thereof. Baseband modem 1006 may be multimode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may store the aforementioned program code or other types of information, such as the look up tables and tables containing the reference templates to be used in the aforementioned correlation processes.

The baseband modem 1006 may be configured to control one or more further components of mobile terminal 1000. The protocol stack(s) of baseband modem 1006 may be configured to control operation of the baseband modem 1006, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g.

regarding an algorithm). The components of baseband modem 106 may be detailed herein substantially in terms of functional operation in recognition that a person of skill in the art may readily appreciate the various possible structural realizations of baseband modem 106 using digital processing circuitry that will provide the desired functionality.

The baseband modem may be configured to perform a number of correlations between a received DMRS signal and a plurality of DMRS templates stored in a memory of device 1000, e.g. in a memory component of the baseband modem or a separate memory component of the communication device (not shown in FIG. 10). Each correlation between the DMRS and the respective DMRS reference template may result in a reference metric, which the baseband modem may be further configured to store in a memory component of the mobile device 1000. The baseband modem may be further configured to choose the sidelink ID according to the reference metric with the highest correlation peak, i.e. the highest metric stored. In sum, the baseband modem may be configured to perform the process described in FIG. 5 and the accompanying written description.

The baseband modem may be further configured to correlate the SSSS with a number of SSSS templates stored in a memory component of device 1000 or of the baseband modem itself. The baseband modem may be configured to calculate a SSSS metric for each correlation between the SSSS and the respective SSSS template and store the SSSS metric. The baseband modem may be further configured to combine the respective SSSS metric and the reference metric from the DMRS together into a single metric, and chose the sidelink ID according to the highest metric stored. In sum, the baseband modem may be configured to perform the process described in FIG. 6 and the accompanying written description.

The baseband modem may also be configured to speed up the correlation process of the DMRS signal by splitting the DMRS signal into halves and correlating the first half of the DMRS sequence with the second half of the DMRS sequence as described in FIG. 7 and the accompanying description.

The baseband modem may be further configured to reduce the complexity of the correlation process of the DMRS signal by reducing the number of complex-value multiplications as described in FIG. 9 and the accompanying description.

The application processor 1008 may be implemented as a Central Processing Unit (CPU), and may function as a controller of mobile terminal 1000. The application processor 1008 may be configured to execute various applications and/or programs of mobile terminal 1000, such as, for example, applications corresponding to program code stored in a memory component of mobile terminal 1000 (not shown in FIG. 10). The application processor 1008 may also be configured to control one or more further components of mobile terminal 1000, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 1006 and application processor 1008 are depicted separately in FIG. 10, it is appreciated that the figure is not limiting in nature. It is understood that the baseband modem 1006 and the application processor 1008 may be implemented separately, implemented together (i.e. as an integrated unit), partially implemented together, etc.

In Example 1, a method for a communication device to detect a sidelink identification from a second device for device to device (D2D) communication, the method comprising: receiving a primary sidelink synchronization signal (PSSS); receiving a demodulation reference signal (DMRS), wherein the DMRS is generated by Zadoff-Chu sequences; performing a plurality of correlations, wherein each correlation of the plurality of correlations comprises determining a DMRS metric by correlating the DMRS with a distinct DMRS template; determining a highest metric from the plurality of correlations; and detecting the sidelink identification according to the highest metric.

In Example 2, the subject matter of example 1 may further include that the distinct DMRS template is one of about three hundred thirty six distinct DMRS templates.

In Example 3, the subject matter of examples 1-2 may further include storing the distinct DMRS templates in a memory component of the communication device.

In Example 4, the subject matter of examples 1-3 may further include determining the symbol timing boundary of the DMRS using the PSSS in order to determine which distinct DMRS templates to use in the plurality of correlations.

In Example 5, the subject matter of examples 1-4 may further include that the plurality of correlations comprises about one hundred sixty eight correlations.

In Example 6, the subject matter of examples 1-5 may further include that the plurality of correlations comprises a blind correlation.

In Example 7, the subject matter of examples 1-6 may further include that each of the plurality of correlations comprises an auto-correlation.

In Example 8, the subject matter of examples 1-7 may further include that each DMRS metric comprises a correlation peak of the DMRS with a distinct DMRS template.

In Example 9, the subject matter of examples 1-8 may further include that storing each DMRS metric in a memory component of the communication device.

In Example 10, the subject matter of examples 1-9 may further include that determining the highest metric comprises determining the distinct DMRS template with the highest correlation peak with the DMRS.

In Example 11, the subject matter of examples 1-10 may further include that synchronizing with the second device using the sidelink identification.

In Example 12, the subject matter of examples 1-11 may further include receiving a secondary sidelink synchronization signal (SSSS); wherein each correlation of the plurality of correlations further comprises determining an SSSS metric by correlating the SSSS with a distinct SSSS template; combining the DMRS metric and the SSSS metric of each of the plurality of correlations to obtain a combined metric; and wherein determining the highest metric further comprises determining the highest combined metric.

In Example 13, the subject matter of example 12 may further include that the distinct SSSS template is one of about three hundred thirty six distinct SSSS templates.

In Example 14, the subject matter of example 13 may further include that storing the distinct SSSS templates in a memory component of the communication device.

In Example 15, the subject matter of any one of examples 12-14 may further include pairing each distinct SSSS template with a corresponding distinct DMRS template.

In Example 16, the subject matter of any one of examples 12-15 may further include determining the timing symbol boundary of the SSSS using the PSSS in order to determine which distinct SSSS templates to use in the plurality of correlations.

In Example 17, the subject matter of any one of examples 12-16 may further include combining the DMRS metric and the SSSS metric of each of the plurality of correlations to get a combined metric comprises a coherent combination.

In Example 18, the subject matter of example 17 may further include that the coherent combination comprises addition of the amplitudes and the phases of the DMRS and SSSS.

In Example 19, the subject matter of any one of examples 12-18 may further include combining of the DMRS metric and the SSSS metric of each of the plurality of correlations to get a combined metric comprises a non-coherent combination.

In Example 20, the subject matter of Example 19 may further include that the non-coherent combination comprising addition of the amplitudes of the DMRS and SSSS.

In Example 21, the subject matter of any one of examples 12-20 may further include determining the highest combined metric comprises determining which of the plurality of correlations results in the combined metric with the highest absolute value.

In Example 22, the subject matter of any one of examples 1-21 may further include splitting the DMRS in half and correlating the first half of the DMRS with the second half of the DMRS.

In Example 23 the subject matter of example 22 may further include correlating the first half of the DMRS with the second half of the DMRS comprises an auto-correlation which produces a correlation metric.

In Example 24 the subject matter of examples 22 or 23 may further include using a maximum likelihood detector to determine whether the correlation metric is positive or negative.

In Example 25, the subject matter of any one of examples 22-24 may further include if the correlation metric is positive, only the distinct DMRS templates associated with an even sidelink identification are used in the plurality of correlations.

In Example 26 the subject matter of any one of examples 22-24 may further include wherein if the correlation metric is negative, only the distinct DMRS templates associated with an odd sidelink identification are used in the plurality of correlations.

In Example 27 the subject matter of any one of examples 22 or 23, wherein only the distinct DMRS templates that correspond with the determined parity of the sidelink identification are used in the plurality of correlations.

In Example 28, a method for a communication device to detect a sidelink identification from a second device for device to device (D2D) communication, the method comprising: receiving a primary sidelink synchronization signal (PSSS); receiving a demodulation reference signal (DMRS), wherein the DMRS is generated by Zadoff-Chu sequences; multiplying the DMRS by a table of rounded values to obtain an interim result, wherein the table of rounded values comprises a rounding phase of all possible DMRS sequences; performing a plurality of correlations, wherein each correlation of the plurality of correlations comprises determining a DMRS metric by correlating the interim result with a distinct DMRS template; determining a highest metric from the plurality of correlations; and detecting the sidelink identification according to the highest metric.

In Example 29, the subject matter of example 28, the rounding phase comprising a three bit rounding phase.

In Example 30, the subject matter of any one of examples 28-29, further comprising storing the table of rounded values in a memory component of the communication device.

In Example 31, the subject matter of any one of examples 28-30, wherein the table of rounded values comprises eight data points.

In Example 32, the subject matter of example 31, wherein the eight data points correspond to points arranged on a unit circle with a radius of one.

In Example 33, the subject matter of example 32, wherein the points arranged along the unit circle are spaced in 45 degree increments along the perimeter of the unit circle.

In Example 34, the subject matter of any one of examples 28-33, wherein the distinct DMRS template is one of about three hundred thirty six distinct DMRS templates.

In Example 35, the subject matter of any one of examples 28-34, further comprising storing the distinct DMRS templates in a memory component of the communication device.

In Example 36, the subject matter of any one of examples 28-35, further comprising determining the timing symbol boundary of the DMRS using the PSSS in order to determine which distinct DMRS templates to use in the plurality of correlations.

In Example 37, the subject matter of any one of examples 28-36, wherein the plurality of correlations comprises about one hundred sixty eight correlations.

In Example 38, the subject matter of any one of examples 28-37, wherein each of the plurality of correlations comprises a blind correlation.

In Example 39, the subject matter of any one of examples 28-38, wherein each of the plurality of correlations comprises an auto-correlation.

In Example 40, the subject matter of any one of examples 28-39, wherein each DMRS metric comprises a correlation peak of the interim result with a distinct DMRS template.

In Example 41, the subject matter of any one of examples 28-40, further comprising storing each DMRS metric in a memory component of the communication device.

In Example 42, the subject matter of any one of examples 28-41, wherein determining the highest metric comprises determining the distinct DMRS template with the highest correlation peak with the interim result.

In Example 43, the subject matter of any one of examples 28-42, wherein detecting the sidelink identification according to the highest metric comprises using the distinct DMRS template with the highest correlation peak with the interim result in order to detect the sidelink identification.

In Example 44, the subject matter of any one of examples 28-43, further comprising synchronizing with the second device using the sidelink identification.

In Example 45, the subject matter of any one of examples 28-44, further comprising: receiving a secondary sidelink synchronization signal (SSSS); wherein each correlation of the plurality of correlations further comprises: determining an SSSS metric by correlating the SSSS with a distinct SSSS template; combining the DMRS metric and the SSSS metric of each of the plurality of correlations to get a combined metric; and wherein determining the highest metric further comprises determining the highest combined metric.

In Example 46, the subject matter of example 45, wherein the distinct SSSS template is one of about three hundred thirty six distinct SSSS templates.

In Example 47, the subject matter of example 46, further comprising storing the three hundred thirty six distinct SSSS templates in a memory component of the communication device.

In Example 48, the subject matter of any one of examples 45-47, further comprising pairing each distinct SSSS template with a corresponding distinct DMRS template.

In Example 49, the subject matter of any one of examples 45-48, further comprising determining the symbol timing boundary of the SSSS using the PSSS in order to determine which distinct SSSS templates to use in the plurality of correlations.

In Example 50, the subject matter of any one of examples 45-49, wherein combining the DMRS metric and the SSSS metric of each of the plurality of correlations to get a combined metric comprises a coherent combination.

In Example 51, the subject matter of any one of examples 50, the coherent combination comprising addition of the amplitudes and the phases of the DMRS and SSSS.

In Example 52, the subject matter of any one of examples 45-49, wherein the combining the DMRS metric and the SSSS metric of each of the plurality of correlations to get a combined metric comprises a non-coherent combination.

In Example 53, the subject matter of example 52, the non-coherent combination comprising addition of the amplitudes of the DMRS and SSSS.

In Example 54, the subject matter of any one of examples 45-53, wherein determining the highest combined metric comprises determining which of the plurality of correlations results in the combined metric with the highest absolute value.

In Example 55, the subject matter of any one of examples 28-54, the method further comprising splitting the DMRS in half and correlating the first half of the DMRS with the second half of the DMRS.

In Example 56, the subject matter of example 55, wherein correlating the first half of the DMRS with the second half of the DMRS comprises an auto-correlation which produces a correlation metric.

In Example 57, the subject matter of any one of examples 55-56, further comprising using a maximum likelihood detector to determine whether the correlation metric is positive or negative.

In Example 58, the subject matter of any one of examples 55-57, wherein if the correlation metric is positive, only the distinct DMRS templates associated with an even sidelink identification are used in the plurality of correlations.

In Example 59, the subject matter of any one of examples 55-57, wherein if the correlation metric is negative, only the distinct DMRS templates associated with an odd sidelink identification are used in the plurality of correlations.

In Example 60, a communication device configured to detect a sidelink identification from a second device for device to device (D2D) communication, the communication device comprising a radio frequency (RF) unit configured to communicate with the second device; a memory component configured to store a plurality of distinct demodulation reference signal (DMRS) templates; and a baseband modem configured to: receive a primary sidelink synchronization signal (PSSS) via the RF unit; receive a DMRS via the RF unit, wherein the DMRS is generated by Zadoff-Chu sequences; perform a plurality of correlations, wherein each correlation of the plurality of correlations comprises determining a DMRS metric by correlating the DMRS with a distinct DMRS template; determine a highest metric from the plurality of correlations; and detect the sidelink identification according to the highest metric.

In Example 61, the subject matter of example 60, wherein the plurality of distinct DMRS templates stored in the memory component comprises about three hundred thirty six templates.

In Example 62, the subject matter of any one of examples 60-61, wherein the baseband modem is further configured to determine the symbol timing boundary of the DMRS from the PSSS in order to determine which distinct DMRS templates to use in the plurality of correlations.

In Example 63, the subject matter of any one of examples 60-62, wherein the plurality of correlations comprises about one hundred sixty eight correlations.

In Example 64, the subject matter of any one of examples 60-63, wherein each of the plurality of correlations comprises a blind correlation.

In Example 65, the subject matter of any one of examples 60-64, wherein each of the plurality of correlations comprises an auto-correlation.

In Example 66, the subject matter of any one of examples 60-65, wherein each DMRS metric comprises a correlation peak of the DMRS with a distinct DMRS template.

In Example 67, the subject matter of any one of examples 60-66, the baseband modem further configured to store each DMRS metric in the memory component of the communication device.

In Example 68, the subject matter of any one of examples 60-67, wherein determining the highest metric comprises determining the distinct DMRS template with the highest correlation peak with the DMRS.

In Example 69, the subject matter of any one of examples 60-68, wherein the communication device is configured to synchronize with the second device using the sidelink identification.

In Example 70, the subject matter of any one of examples 60-69, wherein the baseband modem is further configured to: receive a secondary sidelink synchronization signal (SSSS) via the RF unit; wherein the memory component is further configured to store a plurality of distinct SSSS templates; wherein each correlation of the plurality of correlations further comprises: determining an SSSS metric by correlating the SSSS with a distinct SSSS template; combining the DMRS metric and the SSSS metric of each of the plurality of correlations to obtain a combined metric; and wherein determining the highest metric further comprises determining the highest combined metric.

In Example 71, the subject matter of example 70, wherein the plurality of distinct SSSS templates stored in the memory component comprises about three hundred thirty six templates.

In Example 72, the subject matter of any one of examples 70-71, wherein the baseband modem is further configured to pair a distinct SSSS template with a corresponding distinct DMRS template.

In Example 73, the subject matter of any one of examples 70-72, wherein the baseband modem is further configured to determine the symbol timing boundary of the SSSS using the PSSS in order to determine which distinct SSSS templates to use in the plurality of correlations.

In Example 74, the subject matter of any one of examples 70-73, wherein combining the DMRS metric and the SSSS metric of each of the plurality of correlations to get a combined metric comprises a coherent combination.

In Example 75, the subject matter of example 74, the coherent combination comprising addition of the amplitudes and the phases of the DMRS and SSSS.

In Example 76, the subject matter of any one of examples 70-73, wherein combining the DMRS metric and the SSSS metric of each of the plurality of correlations to get a combined metric comprises a non-coherent combination.

In Example 77, the subject matter of example 76, the non-coherent combination comprising addition of the amplitudes of the DMRS and SSSS.

In Example 78, the subject matter of any one of examples 70-77, wherein determining the highest combined metric comprises determining which of the plurality of correlations results in the combined metric with the highest absolute value.

In Example 79, the subject matter of any one of examples 60-78, the baseband modem being further configured to: split the DMRS in half; and correlate the first half of the DMRS with the second half of the DMRS.

In Example 80, the subject matter of example 79, wherein splitting the DMRS in half results in two DMRS halves in which the second DMRS half is either a duplicate of the first DMRS half or a negative duplicate of the first DMRS half.

In Example 81, the subject matter of any one of examples 79-80, wherein correlating the first half of the DMRS with the second half of the DMRS comprises an auto-correlation which produces a correlation metric.

In Example 82, the subject matter of any one of examples 79-81, the baseband modem being further configured to use a maximum likelihood detector to determine whether the correlation metric is positive or negative.

In Example 83, the subject matter of any one of examples 81-82, wherein if the correlation metric is positive, only the distinct DMRS templates associated with an even sidelink identification are used in the plurality of correlations.

In Example 84, the subject matter of any one of examples 81-83, wherein if the correlation metric is negative, only the distinct DMRS templates associated with an odd sidelink identification are used in the plurality of correlations.

In Example 85, a communication device configured to detect a sidelink identification from a second device for device to device (D2D) communication, the communication device comprising: a radio frequency (RF) unit configured to communicate with the second device; a memory component configured to store a plurality of distinct demodulation reference signal (DMRS) templates; and a baseband modem configured to: receive a primary sidelink synchronization signal (PSSS) via the RF unit; receive a DMRS via the RF unit, wherein the DMRS is generated by Zadoff-Chu sequences; multiply the DMRS by a table of rounded values to obtain an interim result, wherein the table of rounded values comprises a rounding phase of all possible DMRS sequences; perform a plurality of correlations, wherein each correlation of the plurality of correlations comprises determining a DMRS metric by correlating the interim result with a distinct DMRS template; determine a highest metric from the plurality of correlations; and detect the sidelink identification according to the highest metric.

In Example 86, the subject matter of example 85, the rounding phase comprising a three bit rounding phase.

In Example 87, the subject matter of any one of examples 85-86, wherein the table of rounded values is stored in a memory component of the device.

In Example 88, the subject matter of any one of examples 85-87, wherein the table of rounded values comprises eight data points.

In Example 89, the subject matter of example 88, wherein the eight data points correspond to points arranged on a unit circle with a radius of one.

In Example 90, the subject matter of example 89, wherein the points arranged along the unit circle are spaced in 45 degree increments along the perimeter of the unit circle.

In Example 91, the subject matter of any one of examples 85-90, wherein there are about three hundred thirty six distinct DMRS templates.

In Example 92, the subject matter of any one of examples 85-91, wherein the distinct DMRS templates are stored in a memory component of the communication device.

In Example 93, the subject matter of any one of examples 85-92, wherein the baseband modem is further configured to determine the symbol timing boundary of the DMRS from the PSSS in order to determine which distinct DMRS templates to use in the plurality of correlations.

In Example 94, the subject matter of any one of examples 85-93, wherein the plurality of correlations comprises about one hundred sixty eight correlations.

In Example 95, the subject matter of any one of examples 85-94, wherein each of the plurality of correlations comprises a blind correlation.

In Example 96, the subject matter of any one of examples 85-95, wherein each of the plurality of correlations comprises an auto-correlation.

In Example 97, the subject matter of any one of examples 85-96, wherein each DMRS metric comprises a correlation peak of the interim result with a distinct DMRS template.

In Example 98, the subject matter of any one of examples 85-97, the baseband modem being further configured to store each DMRS metric in the memory component of the communication device.

In Example 99 the subject matter of any one of examples 85-98, wherein determining the highest metric comprises determining the distinct DMRS template with the highest correlation peak with the interim result.

In Example 100, the subject matter of any one of examples 85-99, wherein detecting the sidelink identification according to the highest metric comprises using the distinct DMRS template with the highest correlation peak with the interim result in order to detect the sidelink identification.

In Example 101, the subject matter of any one of examples 85-100, wherein the communication device is configured to synchronize with the second device using the sidelink identification.

In Example 102, the subject matter of any one of examples 85-101, wherein the baseband modem is further configured to: receive a secondary sidelink synchronization signal (SSSS) via the RF unit; wherein the memory component is further configured to store a plurality of distinct SSSS templates; wherein each correlation of the plurality of correlations further comprises: determining an SSSS metric by correlating the SSSS with a distinct SSSS template; combining the DMRS metric and the SSSS metric of each of the plurality of correlations to get a combined metric; and wherein determining the highest metric further comprises determining the highest combined metric.

In Example 103, the subject matter of example 102, wherein the distinct SSSS template is one of about three hundred thirty six distinct SSSS templates.

In Example 104, the subject matter of any one of examples 102 or 103, wherein the communication device is further configured to pair a distinct SSSS template with a corresponding distinct DMRS template.

In Example 105, the subject matter of any one of examples 102-104, the baseband modem being further configured to determine the symbol timing boundary of the SSSS from the PSSS in order to determine which distinct SSSS templates to use in the plurality of correlations.

In Example 106, the subject matter of any one of examples 102-105, wherein combining the DMRS metric and the SSSS metric of each of the plurality of correlations to get a combined metric comprises a coherent combination.

In Example 107, the subject matter of any one of examples 116, the coherent combination comprising addition of the amplitudes and the phases of the DMRS and SSSS.

In Example 108, the subject matter of any one of examples 102-105, wherein the combining the DMRS metric and the SSSS metric of each of the plurality of correlations to get a combined metric comprises a non-coherent combination.

In Example 109, the subject matter of any one of examples 108, the non-coherent combination comprising addition of the amplitudes of the DMRS and SSSS.

In Example 110, the subject matter of any one of examples 102-109, wherein determining the highest combined metric comprises determining which of the plurality of correlations results in the combined metric with the highest absolute value.

In Example 111, the subject matter of any one of examples 85-110, the baseband modem being further configured to: split the DMRS in half; and correlate the first half of the DMRS with the second half of the DMRS.

In Example 112, the subject matter of example 111, wherein splitting the DMRS in half results in two DMRS halves in which the second DMRS half is either a duplicate of the first DMRS half or a negative duplicate of the first DMRS half.

In Example 113, the subject matter of example 111 or 112, wherein correlating the first half of the DMRS with the second half of the DMRS comprises an auto-correlation which produces a correlation metric.

In Example 114, the subject matter of any one of examples 111-113, the baseband modem being further configured to use a maximum likelihood detector to determine whether the correlation metric is positive or negative.

In Example 115, the subject matter of any one of examples 113-114, wherein if the correlation metric is positive, only the distinct DMRS templates associated with an even sidelink identification are used in the plurality of correlations.

In Example 116, the subject matter of any one of examples 113-115, wherein if the correlation metric is negative, only the distinct DMRS templates associated with an odd sidelink identification are used in the plurality of correlations.

In Example 117, a non-transitory computer readable medium with program instructions for a communication device to detect a sidelink identification from a second device for device to device (D2D) communication, the instructions comprising: receiving a primary sidelink synchronization signal (PSSS); receiving a demodulation reference signal (DMRS), wherein the DMRS is generated by Zadoff-Chu sequences; performing a plurality of correlations, wherein each correlation of the plurality of correlations comprises determining a DMRS metric by correlating the DMRS with a distinct DMRS template; determining a highest metric from the plurality of correlations; and detecting the sidelink identification according to the highest metric.

In Example 118, the subject matter of example 117, wherein the distinct DMRS template is one of about three hundred thirty six distinct DMRS templates.

In Example 119, the subject matter of any one of examples 117-118, further comprising storing the distinct DMRS templates in a memory component of the communication device.

In Example 120, the subject matter of any one of examples 117-119, further comprising determining the symbol timing boundary of the DMRS using the PSSS in order to determine which distinct DMRS templates to use in the plurality of correlations.

In Example 121, the subject matter of any one of examples 117-120, wherein the plurality of correlations comprises about one hundred sixty eight correlations.

In Example 122, the subject matter of any one of examples 117-121, wherein each of the plurality of correlations comprises a blind correlation.

In Example 123, the subject matter of any one of examples 117-122, wherein each of the plurality of correlations comprises an auto-correlation.

In Example 124, the subject matter of any one of examples 117-123, wherein each DMRS metric comprises a correlation peak of the DMRS with a distinct DMRS template.

In Example 125, the subject matter of any one of examples 117-124, further comprising storing each DMRS metric in a memory component of the communication device.

In Example 126, the subject matter of any one of examples 117-125, wherein determining the highest metric comprises determining the distinct DMRS template with the highest correlation peak with the DMRS.

In Example 127, the subject matter of any one of examples 117-126, further comprising synchronizing with the second device using the sidelink identification.

In Example 128, the subject matter of any one of examples 117-127, with further instructions comprising: receiving a secondary sidelink synchronization signal (SSSS); wherein each correlation of the plurality of correlations further comprises: determining an SSSS metric by correlating the SSSS with a distinct SSSS template; combining the DMRS metric and the SSSS metric of each of the plurality of correlations to obtain a combined metric; and wherein determining the highest metric further comprises determining the highest combined metric.

In Example 129, the subject matter of example 128, wherein the distinct SSSS template is one of about three hundred thirty six distinct SSSS templates.

In Example 130, the subject matter of example 129, wherein the distinct SSSS templates are stored in a memory component of the communication device.

In Example 131, the subject matter of any one of examples 128-130, wherein each distinct SSSS template is paired with a corresponding distinct DMRS template.

In Example 132, the subject matter of any one of examples 128-131, further comprising determining the timing symbol boundary of the SSSS using the PSSS in order to determine which distinct SSSS templates to use in the plurality of correlations.

In Example 133, the subject matter of any one of examples 128-132, wherein combining the DMRS metric and the SSSS metric of each of the plurality of correlations to get a combined metric comprises a coherent combination.

In Example 134, the subject matter of example 133, the coherent combination comprising addition of the amplitudes and the phases of the DMRS and SSSS.

In Example 135, the subject matter of any one of examples 128-132, wherein the combining the DMRS metric and the SSSS metric of each of the plurality of correlations to get a combined metric comprises a non-coherent combination.

In Example 136, the subject matter of example 135, the non-coherent combination comprising addition of the amplitudes of the DMRS and SSSS.

In Example 137, the subject matter of any one of examples 128-136, wherein determining the highest combined metric comprises determining which of the plurality of correlations results in the combined metric with the highest absolute value.

In Example 138, the subject matter of any one of examples 117-137, with further instructions comprising: splitting the DMRS in half; and correlating the first half of the DMRS with the second half of the DMRS.

In Example 139, the subject matter of example 138, wherein correlating the first half of the DMRS with the second half of the DMRS comprises an auto-correlation which produces a correlation metric.

In Example 140, the subject matter of any one of examples 138-139, further comprising using a maximum likelihood detector to determine whether the correlation metric is positive or negative.

In Example 141, the subject matter of any one of examples 138-140, wherein if the correlation metric is positive, only the distinct DMRS templates associated with an even sidelink identification are used in the plurality of correlations.

In Example 142, the subject matter of any one of examples 138-141, wherein if the correlation metric is negative, only the distinct DMRS templates associated with an odd sidelink identification are used in the plurality of correlations.

In Example 143, the subject matter of any one of examples 138-142, wherein only the distinct DMRS templates that correspond with the determined parity of the sidelink identification are used in the plurality of correlations.

In Example 144, a non-transitory computer readable medium with program instructions for a communication device to detect a sidelink identification from a second device for device to device (D2D) communication, the instructions comprising: receiving a primary sidelink synchronization signal (PSSS); receiving a demodulation reference signal (DMRS), wherein the DMRS is generated by Zadoff-Chu sequences; multiplying the DMRS by a table of rounded values to obtain an interim result, wherein the table of rounded values comprises a rounding phase of all possible DMRS sequences; performing a plurality of correlations, wherein each correlation of the plurality of correlations comprises determining a DMRS metric by correlating the interim result with a distinct DMRS template; determining a highest metric; and detecting the sidelink identification according to the highest metric.

In Example 145, the subject matter of example 144, the rounding phase comprising a three bit rounding phase.

In Example 146, the subject matter of any one of examples 144-145, wherein the table of rounded values is stored in a memory component of the communication device.

In Example 147, the subject matter of any one of examples 144-146, wherein the table of rounded values comprises eight data points.

In Example 148, the subject matter of example 147, wherein the eight data points correspond to points arranged on a unit circle with a radius of one.

In Example 149, the subject matter of any one of examples 147-148, wherein the points arranged along the unit circle are spaced in 45 degree increments along the perimeter of the unit circle.

In Example 150, the subject matter of any one of examples 144-149, wherein the distinct DMRS template is one of about three hundred thirty six distinct DMRS templates.

In Example 151, the subject matter of any one of examples 144-150, wherein the distinct DMRS templates are stored in a memory component of the communication device.

In Example 152, the subject matter of any one of examples 144-151, further comprising determining the timing symbol boundary of the DMRS using the PSSS in order to determine which distinct DMRS templates to use in the plurality of correlations.

In Example 153, the subject matter of any one of examples 144-152, wherein the plurality of correlations comprises about one hundred sixty eight correlations.

In Example 154, the subject matter of any one of examples 144-153, wherein each of the plurality of correlations comprises a blind correlation.

In Example 155, the subject matter of any one of examples 144-154, wherein each of the plurality of correlations comprises an auto-correlation.

In Example 156, the subject matter of any one of examples 144-155, wherein each DMRS metric comprises a correlation peak of the interim result with a distinct DMRS template.

In Example 157, the subject matter of any one of examples 144-156, wherein each DMRS metric is stored in a memory component of the communication device.

In Example 158, the subject matter of any one of examples 144-157, wherein determining the highest metric comprises determining the distinct DMRS template with the highest correlation peak with the interim result.

In Example 159, the subject matter of any one of examples 144-158, wherein detecting the sidelink identification according to the highest metric comprises using the distinct DMRS template with the highest correlation peak with the interim result in order to detect the sidelink identification.

In Example 160, the subject matter of any one of examples 144-159, further comprising synchronizing with the second device using the sidelink identification.

In Example 161, the subject matter of any one of examples 144-160, with further instructions comprising: receiving a secondary sidelink synchronization signal (SSSS); wherein each correlation of the plurality of correlations further comprises: determining an SSSS metric by correlating the SSSS with a distinct SSSS template; combining the DMRS metric and the SSSS metric of each of the plurality of correlations to get a combined metric; and wherein determining the highest metric further comprises determining the highest combined metric.

In Example 162, the subject matter of example 161, wherein the distinct SSSS template is one of about three hundred thirty six distinct SSSS templates.

In Example 163, the subject matter of example 162, wherein the distinct SSSS templates are stored in a memory component of the communication device.

In Example 164, the subject matter of any one of examples 161-163, wherein each distinct SSSS template is paired with a corresponding distinct DMRS template.

In Example 165, the subject matter of any one of examples 161-164, further comprising determining the symbol timing boundary of the SSSS using the PSSS in order to determine which distinct SSSS templates to use in the plurality of correlations.

In Example 166, the subject matter of any one of examples 161-165, wherein combining the DMRS metric and the SSSS metric of each of the plurality of correlations to get a combined metric comprises a coherent combination.

In Example 167, the subject matter of example 166, the coherent combination comprising addition of the amplitudes and the phases of the DMRS and SSSS.

In Example 168, the subject matter of any one of examples 161-165, wherein the combining the DMRS metric and the SSSS metric of each of the plurality of correlations to get a combined metric comprises a non-coherent combination.

In Example 169, the subject matter of example 168, the non-coherent combination comprising addition of the amplitudes of the DMRS and SSSS.

In Example 170, the subject matter of any one of examples 161-169, wherein determining the highest combined metric comprises determining which of the plurality of correlations results in the combined metric with the highest absolute value.

In Example 171, the subject matter of any one of examples 144-170, with further instructions comprising: splitting the DMRS in half; and correlating the first half of the DMRS with the second half of the DMRS.

In Example 172 the subject matter of example 171, wherein correlating the first half of the DMRS with the second half of the DMRS comprises an auto-correlation which produces a correlation metric.

In Example 173, the subject matter of any one of examples 171-172, further comprising using a maximum likelihood detector to determine whether the correlation metric is positive or negative.

In Example 174, the subject matter of any one of examples 171-173, wherein if the correlation metric is positive, only the distinct DMRS templates associated with an even sidelink identification are used in the plurality of correlations.

In Example 175, the subject matter of any one of examples 171-174, wherein if the correlation metric is negative, only the distinct DMRS templates associated with an odd sidelink identification are used in the plurality of correlations.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A communication device configured to detect a sidelink identification from a second device for device to device (D2D) communication, the communication device comprising:
    a radio frequency (RF) unit configured to communicate with the second device;
    a memory component configured to store a plurality of distinct demodulation reference signal (DMRS) templates; and
    a baseband modem configured to:
    receive a primary sidelink synchronization signal (PSSS) via the RF unit;
    receive a DMRS via the RF unit, wherein the DMRS has been generated using Zadoff-Chu sequences;
    perform a plurality of correlations, wherein each correlation of the plurality of correlations comprises determining a DMRS metric by correlating the DMRS with a distinct DMRS template;
    determine a highest metric from the plurality of correlations; and
    detect the sidelink identification according to the highest metric.

2. The communication device of claim 1, wherein each DMRS metric comprises a correlation peak of the DMRS with a distinct DMRS template.

3. The communication device of claim 1, the baseband modem further configured to store each DMRS metric in the memory component of the communication device.

4. The communication device of claim 1, wherein determining the highest metric comprises determining the distinct DMRS template with the highest correlation peak with the DMRS.

5. The communication device of claim 1, wherein the baseband modem is further configured to:
    receive a secondary sidelink synchronization signal (SSSS) via the RF unit;
    wherein the memory component is further configured to store a plurality of distinct SSSS templates;
    wherein each correlation of the plurality of correlations further comprises:
    determining an SSSS metric by correlating the SSSS with a distinct SSSS template;
    combining the DMRS metric and the SSSS metric of each of the plurality of correlations to obtain a combined metric; and
    wherein determining the highest metric further comprises determining the highest combined metric.

6. The communication device of claim 5, wherein the baseband modem is further configured to pair a distinct SSSS template with a corresponding distinct DMRS template.

7. The communication device of claim 5, wherein combining the DMRS metric and the SSSS metric of each of the plurality of correlations to get a combined metric comprises a coherent combination.

8. The communication device of claim 5, wherein combining the DMRS metric and the SSSS metric of each of the plurality of correlations to get a combined metric comprises a non-coherent combination.

9. The communication device of claim 1, the baseband modem being further configured to:
    split the DMRS in half; and
    correlate the first half of the DMRS with the second half of the DMRS.

10. The communication device of claim 9, wherein correlating the first half of the DMRS with the second half of the DMRS comprises an auto-correlation which produces a correlation metric.

11. The communication device of claim 10, the baseband modem being further configured to use a maximum likelihood detector to determine whether the correlation metric is positive or negative.

12. A communication device configured to detect a sidelink identification from a second device for device to device (D2D) communication, the communication device comprising:
- a radio frequency (RF) unit configured to communicate with the second device;
- a memory component configured to store a plurality of distinct demodulation reference signal (DMRS) templates; and
- a baseband modem configured to:
- receive a primary sidelink synchronization signal (PSSS) via the RF unit;
- receive a DMRS via the RF unit, wherein the DMRS has been generated using Zadoff-Chu sequences;
- multiply the DMRS by a table of rounded values to obtain an interim result, wherein the table of rounded values comprises a rounding phase of all possible DMRS sequences;
- perform a plurality of correlations, wherein each correlation of the plurality of correlations comprises determining a DMRS metric by correlating the interim result with a distinct DMRS template;
- determine a highest metric from the plurality of correlations; and
- detect the sidelink identification according to the highest metric.

13. The communication device of claim 12, wherein the baseband modem is further configured to:
- receive a secondary sidelink synchronization signal (SSSS) via the RF unit;
- wherein the memory component is further configured to store a plurality of distinct SSSS templates;
- wherein each correlation of the plurality of correlations further comprises:
- determining an SSSS metric by correlating the SSSS with a distinct SSSS template;
- combining the DMRS metric and the SSSS metric of each of the plurality of correlations to get a combined metric; and
- wherein determining the highest metric further comprises determining the highest combined metric.

14. The communication device of claim 12, the baseband modem being further configured to:
- split the DMRS in half; and
- correlate the first half of the DMRS with the second half of the DMRS.

15. A method for a communication device to detect a sidelink identification from a second device for device to device (D2D) communication, the method comprising:
- receiving a primary sidelink synchronization signal (PSSS);
- receiving a demodulation reference signal (DMRS), wherein the DMRS has been generated using Zadoff-Chu sequences;
- performing a plurality of correlations, wherein each correlation of the plurality of correlations comprises determining a DMRS metric by correlating the DMRS with a distinct DMRS template;
- determining a highest metric from the plurality of correlations; and
- detecting the sidelink identification according to the highest metric.

16. The method of claim 15, wherein each DMRS metric comprises a correlation peak of the DMRS with a distinct DMRS template.

17. The method of claim 15, further comprising storing each DMRS metric in a memory component of the communication device.

18. The method of claim 15, the method further comprising:
- receiving a secondary sidelink synchronization signal (SSSS);
- wherein each correlation of the plurality of correlations further comprises:
- determining an SSSS metric by correlating the SSSS with a distinct SSSS template;
- combining the DMRS metric and the SSSS metric of each of the plurality of correlations to obtain a combined metric; and
- wherein determining the highest metric further comprises determining the highest combined metric.

19. The method of claim 15, the method further comprising:
- splitting the DMRS in half; and
- correlating the first half of the DMRS with the second half of the DMRS.

20. A method for a communication device to detect a sidelink identification from a second device for device to device (D2D) communication, the method comprising:
- receiving a primary sidelink synchronization signal (PSSS);
- receiving a demodulation reference signal (DMRS), wherein the DMRS has been generated using Zadoff-Chu sequences;
- multiplying the DMRS by a table of rounded values to obtain an interim result, wherein the table of rounded values comprises a rounding phase of all possible DMRS sequences;
- performing a plurality of correlations, wherein each correlation of the plurality of correlations comprises determining a DMRS metric by correlating the interim result with a distinct DMRS template;
- determining a highest metric from the plurality of correlations; and
- detecting the sidelink identification according to the highest metric.

21. The method of claim 20, further comprising:
- receiving a secondary sidelink synchronization signal (SSSS);
- wherein each correlation of the plurality of correlations further comprises:
- determining an SSSS metric by correlating the SSSS with a distinct SSSS template;
- combining the DMRS metric and the SSSS metric of each of the plurality of correlations to get a combined metric; and
- wherein determining the highest metric further comprises determining the highest combined metric.

22. The method of claim 20, the method further comprising:
- splitting the DMRS in half; and
- correlating the first half of the DMRS with the second half of the DMRS.

* * * * *